United States Patent
Okada et al.

[11] Patent Number: 5,962,787
[45] Date of Patent: Oct. 5, 1999

[54] ACCELERATION SENSOR

[75] Inventors: Kazuhiro Okada; Jundo Nakatugawa, both of Ageo, Japan

[73] Assignee: Wacoh Corporation, Saitama, Japan

[21] Appl. No.: 08/733,471

[22] Filed: Oct. 18, 1996

[30] Foreign Application Priority Data

Oct. 24, 1995 [JP] Japan .................................. 7-298952

[51] Int. Cl.⁶ .................................................. G01P 3/42
[52] U.S. Cl. ..................... 73/514.32; 73/514.16
[58] Field of Search ........................... 73/862.68, 514.24, 73/12.01, 862.626, 862.043, 514.18, 514.32; 367/181; 340/690, 689, 669; 361/283.4

[56] References Cited

U.S. PATENT DOCUMENTS

| | | | |
|---|---|---|---|
| 2,599,775 | 6/1952 | Peterson | 367/181 |
| 3,372,386 | 3/1968 | Klinger | 340/669 |
| 4,372,162 | 2/1983 | Shutt | 73/514.24 |
| 4,372,520 | 2/1983 | Shutt | 73/514.24 |
| 4,572,006 | 2/1986 | Wolfendale | 73/862.626 |
| 4,905,523 | 3/1990 | Okada | 73/862.04 |
| 4,922,159 | 5/1990 | Phillips et al. | 73/514.24 |
| 4,945,347 | 7/1990 | Perry | 340/690 |
| 4,967,605 | 11/1990 | Okada | 73/862.04 |
| 4,969,366 | 11/1990 | Okada | 73/862.08 |
| 5,014,415 | 5/1991 | Okada | 29/621.1 |
| 5,035,148 | 7/1991 | Okada | 73/862.04 |
| 5,092,645 | 3/1992 | Okada | 294/86.4 |
| 5,182,515 | 1/1993 | Okada | 324/259 |
| 5,263,375 | 11/1993 | Okada | 73/862.04 |
| 5,295,386 | 3/1994 | Okada . | |
| 5,343,765 | 9/1994 | Okada | 73/862.043 |
| 5,365,799 | 11/1994 | Okada | 73/862.041 |
| 5,392,658 | 2/1995 | Okada | 73/862.043 |
| 5,406,848 | 4/1995 | Okada | 73/517 R |
| 5,418,523 | 5/1995 | Anderson et al. | 340/669 |
| 5,421,213 | 6/1995 | Okada | 73/862.043 |
| 5,437,196 | 8/1995 | Okada | 73/862.043 |
| 5,473,307 | 12/1995 | Lam | 340/689 |
| 5,492,020 | 2/1996 | Okada | 73/862.626 |
| 5,497,668 | 3/1996 | Okada | 73/862.626 |
| 5,531,002 | 7/1996 | Okada | 29/25.41 |

Primary Examiner—Ronald L. Biegel
Attorney, Agent, or Firm—Ladas & Parry

[57] ABSTRACT

A fixed substrate and a displacement substrate are disposed in parallel. The fixed substrate is secured to the inside of a cylindrical casing, and the displacement substrate is elastically supported at the periphery thereof by supporting means. A columnar weight body is secured to the lower surface of the displacement substrate, and a cylindrical inside electrode is formed on the periphery of the weight body. A cylindrical outside electrode is fixed by fixing means at the periphery of the inside electrode. A first capacitance element is constituted by a displacement electrode formed on the upper surface of the displacement substrate and a fixed electrode formed on the lower surface of the fixed substrate. By a change in the capacitance thereof, an acceleration based on longitudinal vibration is detected. In addition, a second capacitance element is constituted by the inside electrode and the outside electrode. By a change in the capacitance thereof, an acceleration based on transverse vibration is detected.

9 Claims, 11 Drawing Sheets

ACCELERATION SENSOR

BACKGROUND OF THE INVENTION

This invention relates to an acceleration sensor and, more particularly, to an acceleration sensor suitable for detecting acceleration based on earthquake or collision of automotive vehicle.

In view of grasping movement of an object, detection of acceleration has important meaning. For this reason, various acceleration sensors have been conventionally proposed. Particularly, in recent years, the spotlight of attention upon multi-dimensional acceleration sensors capable of detecting two-dimensional or three-dimensional acceleration every respective directional components has been focused. For example, in the International Publication No. WO88/08522 based on the Patent Cooperation Treaty, a three-dimensional acceleration sensor using piezo resistance element is disclosed. In this sensor, plural piezo resistance elements are formed at specific positions on a semiconductor substrate, thereby making it possible to respectively independently detect acceleration components in respective coordinate axes directions in the XYZ three-dimensional coordinate system. Moreover, in the International Publication No. WO91/10118 or the International Publication No. WO92/17759, a three-dimensional acceleration sensor using electrostatic capacitance elements is disclosed. In the International Publication No. WO93/02342, a three-dimensional acceleration sensor using piezoelectric elements is disclosed. In these sensors, plural electrodes are formed at specific positions, thereby making it possible to respectively independently detect acceleration components in respective coordinate axes directions in the XYZ three-dimensional coordinate system in a manner similar to the above.

In such three-dimensional acceleration sensors, since all of respective coordinate axes direction components of applied acceleration can be respectively independently detected by a single sensor, it is possible to specify acceleration to be detected as a vector quantity within the three-dimensional space. Accordingly, such three-dimensional acceleration sensors can be widely utilized in use for precisely detecting acceleration exerted at an object moving within the three-dimensional space, e.g., a cruising vehicle, or an air-plane in flight, etc. in a manner to include its direction. In future, it is expected that its utilization value will be increased.

On the other hand, the acceleration sensor can be utilized also as a seismometer or an impact meter. For example, in a control system for controlling valves of city gas infrastructure or a control system for elevators, an acceleration sensor functioning as a seismometer is included. When an acceleration based on vibration of earthquake exceeds a predetermined threshold value, the control system operates to stop supplying of gas, or to stop operation of the elevator. Moreover, in automotive vehicles with an air bag system which becomes popularized rapidly in recent years, an acceleration sensor functioning as an impact meter is mounted. In this system, there is employed a mechanism to momentarily swell the air bag to protect a driver in the case where an acceleration based on impact exceeds a predetermined threshold value. However, the conventional seismometer or the impact meter generally includes a mechanical sensor instead of the above-described three-dimensional sensors. The mechanical sensor has a function to mechanically detect an acceleration by such a way to recognize whether or not a steel ball is flown out from a bowl-shaped vessel.

As described above, in the conventional seismometer or impact meter, mechanical acceleration sensors are mainly utilized. However, in such a mechanical acceleration sensor, there are problems that detection accuracy or reliability is low and that it is difficult to electrically take out detection result. On the other hand, three-dimensional acceleration sensors using piezo resistance elements, capacitance elements or piezoelectric elements have high detection accuracy and reliability, and can electrically take out detection results. However, in the purpose for the seismometer or the impact meter, such three-dimensional acceleration sensors are not necessarily required and there are even instances where such three-dimensional acceleration sensors are not suitable.

For example, in the purpose for measuring intensity of earthquake, it is sufficient to provide a function to respectively independently detect the so-called "transverse vibration (vibration in the horizontal direction)" and the so-called "longitudinal vibration (vibration in the vertical direction)" by the earthquake. At this time, it is desirable to have an ability of directly detecting the magnitude of "transverse vibration" and the magnitude of "longitudinal vibration". Generally, it is known that "transverse vibration" in the earthquake is vibration resulting from vibrating wave called "S wave", and the "longitudinal vibration" is vibration resulting from vibrating wave called "P wave". As long as it is possible to respectively independently detect the magnitude of the S wave and the magnitude of the P wave, such detection mechanism can sufficiently function as a seismometer. Namely, when an XYZ three-dimensional coordinate system respectively having an XY-plane on the horizontal surface and a Z-axis in the vertical direction is defined, if the magnitude of vibration in the direction along the XY-plane (transverse vibration) and the magnitude of vibration in the direction along the Z-axis (longitudinal vibration) can be measured, such detection mechanism can sufficiently satisfy the seismometer.

It is a matter of course that even if the conventionally proposed three-dimensional acceleration sensor is employed, the above described measurement can be made. When the conventional three-dimensional acceleration sensor is used for a seismometer, precise detection in which even the azimuth is specified such as "transverse vibration along the direction of the north-northeast" can be made. However, for the purpose of carrying out supply control of the city gas or operation control of the elevator, it is unnecessary to specify an azimuth of the transverse vibration. When the magnitude of transverse vibration exceeds a predetermined threshold value, irrespective of "transverse vibration along the direction of the north-northeast" or "transverse vibration along the direction of southeast", it is necessary to stop supply of the city gas or to stop operation of the elevator. In other words, as long as the magnitude of the transverse vibration can be detected, it is possible to sufficiently perform the function as an acceleration sensor used in the seismometer. Moreover, in the conventional three-dimensional acceleration sensor, since X-axis direction component $\alpha x$, Y-axis direction component $\alpha y$ and Z-axis direction component $\alpha z$ are respectively independently detected with respect to the acceleration in the XYZ three-dimensional coordinate system, a mathematical operations (calculations) to obtain a sum of $\alpha x^2 + \alpha y^2$ and a square root of this sum are required in order to determine the magnitude of transverse vibration along the XY plane.

As stated above, the conventional three-dimensional acceleration sensor can be used as a seismometer. However, since the structure becomes complicated and a specific operation circuit to be adopted for a seismometer is required, there results the problem that the cost is increased as a whole. Particularly, when attention is drawn to utilization to the supply control of the city gas or the operation control of the elevator, it is necessary to provide such acceleration sensors within respective gas meters which are installed in respective homes or within respective control units which are installed in respective elevators. Therefore, a low cost acceleration sensor having a simple structure is expected.

Such circumstances are the same also in acceleration sensors used as an impact meter for operating the air bag system of the automotive vehicle. If the cruising surface of the automotive vehicle is assumed to be an XY plane, impact produced by collision of the vehicle is the impact mainly including an acceleration component along the XY plane. Accordingly, the acceleration component along the Z-axis can be neglected. In addition, irrespective of whether corresponding collision is the frontal (head-on) collision or side collision, it is the common fact that the impact to make a driver injured is to be applied. Namely, even if collision in any direction takes place, there is the necessity of swelling the air bag to protect the driver. Accordingly, if magnitude of acceleration component in a direction along the XY plane can be detected, such acceleration detection sufficiently satisfies the purpose. Namely, it is unnecessary to precisely detect the direction of the acceleration.

SUMMARY OF THE INVENTION with the above in view, an object of this invention is to provide an acceleration sensor suitable for detecting, as an electric signal, a magnitude of acceleration along a direction included within a predetermined plane.

(1) The first feature of this invention is directed to an acceleration sensor comprising:

a sensor casing;

a displacement substrate accommodated within the sensor casing;

supporting means for elastically (resiliently) supporting the periphery of the displacement substrate with respect to the sensor casing;

a weight body secured to the lower surface of the displacement substrate and having a mass sufficient to allow the supporting means to induce elastic (resilient) deformation by action of acceleration to be detected;

an inside electrode formed on the peripheral side surface of the weight body in a manner to surround a center axis passing through the center of gravity of the weight body and perpendicular to a reference principal surface of the displacement substrate;

an outside electrode which takes a tubular shape which permits the inside electrode to be accommodated therewithin, the outside electrode being fixed to the sensor casing in the state positioned in a manner to surround the inside electrode while maintaining a predetermined spacing (distance) between the outside electrode and the inside electrode; and a detection circuit for outputting an electric signal indicating magnitude of acceleration applied in a direction in parallel to the reference principal surface on the basis of a change in the electrostatic capacitance of a capacitance element formed by the inside electrode and the outside electrode;

wherein there is employed a configuration in which, in order that the effective facing areas between the inside electrode and the outside electrode become constant even in the case where the weight body is caused to undergo displacement along the center axis, with respect to the width in the center axis direction of the inside electrode and the width in the center axis direction of the outside electrode, one width is caused to be broader than the other width at least by a range of displacement along the center axis of the weight body.

(2) The second feature of this invention is characterized in that, in the above-described acceleration sensor according to the first feature, there are further provided:

a displacement electrode formed on the upper surface of the displacement substrate; and a fixed electrode fixed to the sensor casing in a manner opposite to the displacement electrode above the displacement substrate;

wherein the detection circuit further outputs an electric signal indicating magnitude of acceleration applied in a direction perpendicular to the reference principal surface on the basis of a change in the electrostatic capacitance of a capacitance element formed by the displacement electrode and the fixed electrode.

(3) The third feature of this invention is characterized in that, in the above-described acceleration sensor according to the first or second feature:

a columnar weight body is used so as to constitute the inside electrode by a cylindrical electrode formed on the side surface of the columnar weight body, and to constitute the outside electrode by another cylindrical electrode having a diameter greater than that of the cylindrical electrode constituting the inside electrode.

(4) The fourth feature of this invention is characterized in that, in the above-described acceleration sensor according to the first or second feature:

setting is made such that the spacing (distance) between the inside electrode and the outside electrode partially differs in the reference state where acceleration to be detected is not applied, in order to vary detection sensitivity of acceleration applied in a direction in parallel to the reference principal surface in dependency upon the detection direction.

(5) The fifth feature of this invention is characterized in that, in the above-described acceleration sensor according to the fourth feature:

one of the inside electrode and the outside electrode is constituted by a cylindrical electrode circular in cross section, and the other is constituted by an elliptic cylindrical electrode elliptic in cross section.

(6) The sixth feature of this invention is characterized in that, in the above-described acceleration sensor according to any one of the second to fifth features:

the displacement substrate is constituted by conductive material and a portion of the displacement substrate is used as the displacement electrode.

(7) The seventh feature of this invention is characterized in that, in the above-described acceleration sensor according to any one of the first to sixth features:

the weight body is constituted by conductive material and a portion of the weight body is used as the inside electrode.

(8) The eighth feature of this invention is characterized in that, in the above-described acceleration sensor according to any one of the first to seventh features:

the sensor casing is constituted by conductive material and a portion of the sensor casing is used as the outside electrode.

(9) The ninth feature of this invention is characterized in that, in the above-described acceleration sensor according to any one of the first to eighth features:

plural slits are formed at a flexible substrate to thereby constitute a diaphragm and the diaphragm is used as the displacement substrate and the supporting means.

DESCRIPTION OF THE PREFERRED EMBODIMENTS

This invention will now be described in accordance with the embodiments shown below.

§ 1 Structure of Acceleration Sensor

Figure 1:
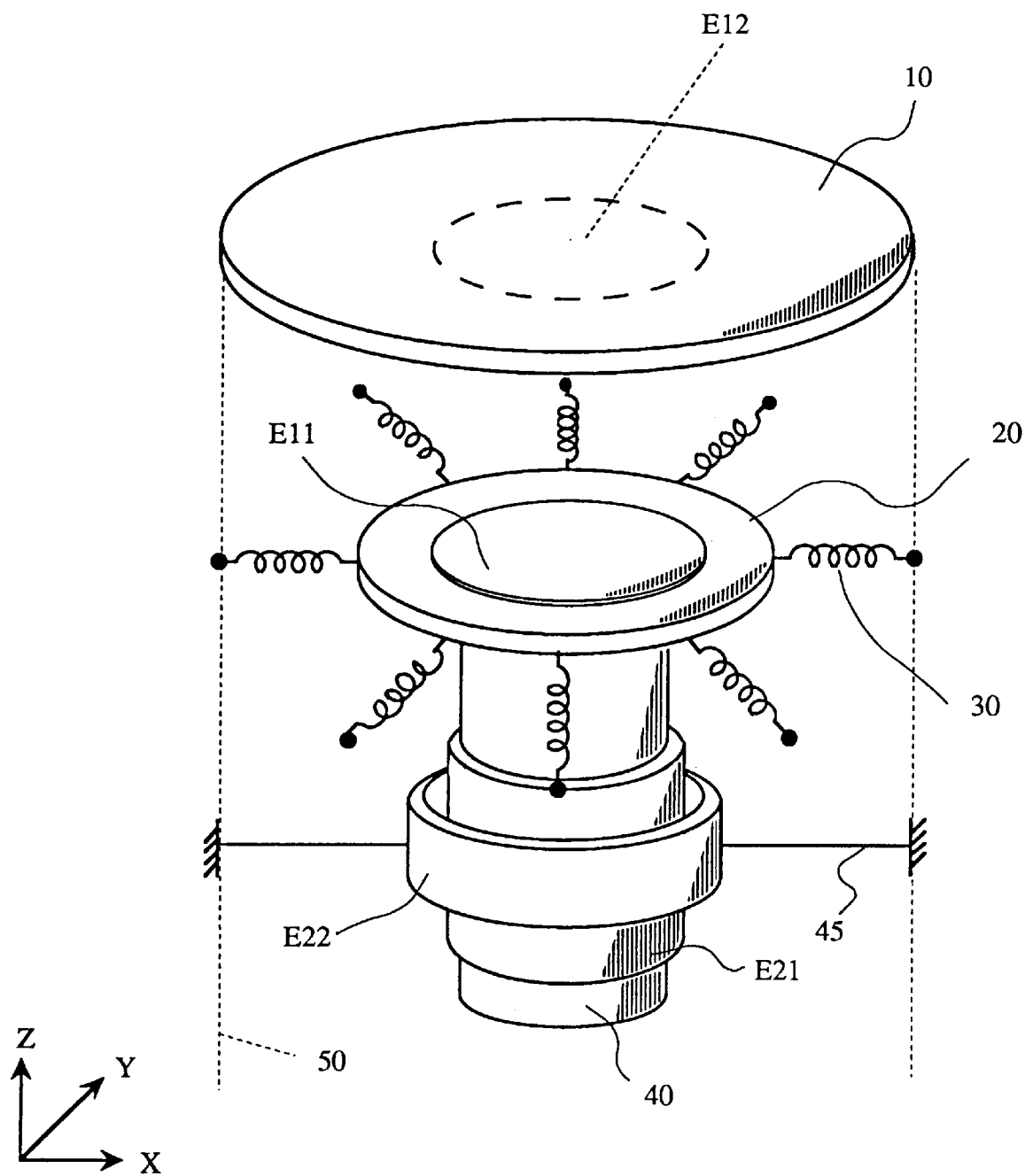
FIG. 1 is a perspective view of the principal part of an acceleration sensor according to the fundamental embodiment of this invention.
Figure 2:
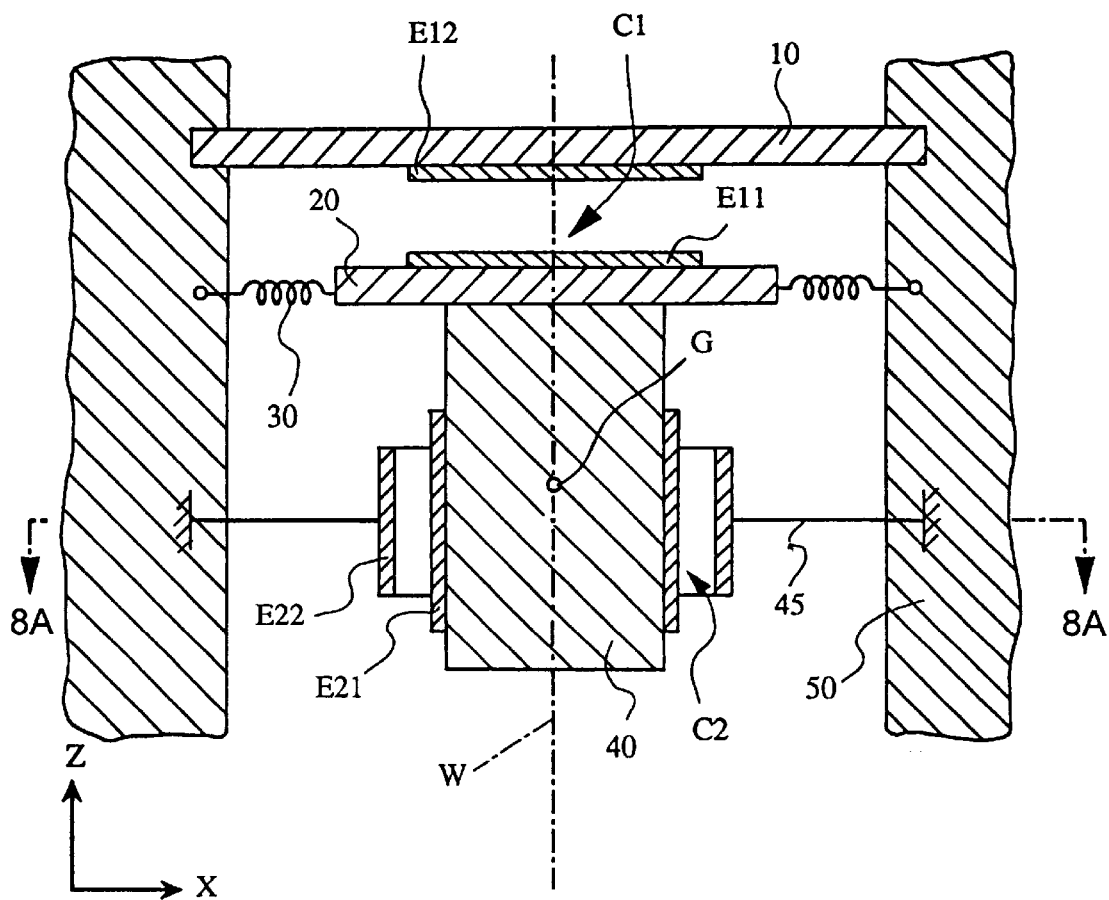
FIG. 2 is a side cross sectional view of the acceleration sensor shown in FIG. 1.

The perspective view of the principal part of an acceleration sensor according to the fundamental embodiment of this invention is shown in FIG. 1, and the side cross sectional view thereof is shown in FIG. 2. As shown in FIG. 1, this acceleration sensor includes a disk-shaped fixed substrate 10 and a similarly disk-shaped displacement substrate 20, wherein supporting means 30 is attached at the periphery of the displacement substrate 20. A disk-shaped displacement electrode E11 is formed on the upper surface of the displacement substrate 20, and a fixed electrode E12 is formed on the lower surface of the fixed substrate 10 in a manner opposite to the displacement electrode E11. Moreover, a columnar weight body 40 is secured on the lower surface of the displacement substrate 20, and a cylindrical inside electrode E21 is formed on the side surface of the weight body 40. In addition, a cylindrical outside electrode E22 having a larger diameter is provided at the outside of the inside electrode E21, and the outside electrode E22 is fixed to the cylindrical sensor casing 50 by fixing means 45.

These components are all accommodated within a cylindrical sensor casing 50 (its structure is not shown in FIG. 1). The side cross sectional view of FIG. 2 indicates a cross section when these components are cut by the plane including a center axis W passing through the center of gravity G of the weight body 40. In FIG. 2, the structure of the sensor casing 50 which is not shown in FIG. 1 is illustrated. As understood with reference to FIG. 2, the periphery of the fixed substrate 10 is fitted and secured to the inside of the sensor casing 50. In other words, the periphery of the disk-shaped fixed substrate 10 is secured to the inside of the cylindrical sensor casing 50 over the entire circumference thereof. On the other hand, the displacement substrate 20 is supported inside the sensor casing 50 by the supporting means 30 attached at the periphery thereof. The supporting means 30 has a function to elastically or resiliently support the periphery of the displacement substrate 20 with respect to the sensor casing 50. Although the example where eight springs are used as the supporting means 30 is disclosed in this fundamental embodiment, it is preferable from a viewpoint of practical use to constitute the displacement substrate 20 and the supporting means 30 by using a diaphragm having slits, etc. as shown in the embodiment which will be described later.

Moreover, the outside electrode E22 is fixed to the inside of the sensor casing 50 by fixing means 45. Although more practical structure of the fixing means 45 is not disclosed in this fundamental embodiment, as long as there is employed a structure such that the outside electrode E22 is secured so that it is not moved with respect to the sensor casing 50, the fixing means 45 may be realized by any structure. In the embodiment which will be described later, there is employed a structure in which a portion of the sensor casing 50 is projected toward the inside so that a partial end surface of the sensor casing 50 serves as the outside electrode E22.

In the state where acceleration to be detected is not applied to the sensor casing 50, the fixed substrate 10 and the displacement substrate 20 are maintained substantially in parallel state spaced by a predetermined distance therebetween as shown in FIG. 2. As a result, the displacement electrode E11 and the fixed electrode E12 are placed in substantially parallel state spaced by a predetermined distance therebetween. Moreover, the spacing (distance) between the inside electrode E21 and the outside electrode E22 is maintained substantially constant. In this specification, a position of the principal surface (e.g., the upper surface) of the displacement substrate 20 in the state where acceleration to be detected is not applied is referred to "reference principal surface". As shown in FIG. 2, the reference principal surface of the displacement substrate 20 is in parallel to the principal surface of the fixed substrate 10, and the center axis W passing through the center of gravity G of the columnar weight body 40 is perpendicular to the reference principal surface. In addition, the inside electrode E21 is formed on the peripheral side surface of the weight body 40 so as to surround the center axis W, and the outside electrode E22 takes a cylindrical shape which permits the inside electrode E21 to be accommodated therewithin and is fixed to the sensor casing 50 in the state positioned in a manner to surround the inside electrode E21 while maintaining a predetermined spacing (distance) between the outside electrode E22 and the inside electrode E21.

The weight body 40 is supported within the sensor casing 50 through the displacement substrate 20 and the supporting means 30, and is caused to be in a suspended state within the sensor casing 50 by the supporting means 30. Accordingly, when elastic deformation takes place in the supporting means 30, the relative position with respect to the sensor casing 50 of the weight body 40 changes, so that the displacement electrode E11 and the inside electrode E21 are also caused to undergo displacement. On the contrary, the fixed electrode E12 is fixed to the sensor casing 50 by the fixed substrate 10, and the outside electrode E22 is fixed to the sensor casing 50 by the fixing means 45. Accordingly, when the weight body 40 is caused to undergo displacement by elastic deformation of the supporting means 30, a change takes place in the relative position between the displacement electrode E11 and the fixed electrode E12, and a change takes place also in the relative position between the inside electrode E21 and the outside electrode E22.

When acceleration is applied to the entirety of the sensor, force based on acceleration is applied to the center of gravity G of the weight body 40. As a result, the supporting means 30 is caused to undergo elastic deformation by this force. Thus, changes take place in the relative positions between the above-described respective electrodes. For example, if such an acceleration sensor is installed at a predetermined earthquake observation point, acceleration is applied to the weight body 40 on the basis of vibration at the earthquake observation point when earthquake takes place. Thus, the weight body 40 is oscillated within the sensor casing 50. As a result, changes take place in the relative positions between respective electrodes. It is a matter of course that the weight body 40 must have mass sufficient to allow the supporting means 30 to induce elastic deformation by action of acceleration to be detected. The sensitivity of the acceleration sensor can be adjusted by suitably selecting elastic coefficient of the supporting means 30 and mass of the weight body 40.

It is to be noted that an XYZ three-dimensional coordinate system as indicated at the lower left corner of FIG. 1 is defined for convenience of explanation. The principal surface of the fixed substrate 10 and the reference principal surface of the displacement substrate 20 are both plane surfaces in parallel to the XY plane in this coordinate system. Moreover, the center axis W passing through the center of gravity G of the weight body 40 and in parallel to the Z-axis is defined as shown in FIG. 2. In this embodiment, the fixed substrate 10, the displacement substrate 20, the weight body 40 and the sensor casing 50 are all body of rotation of symmetry with respect to the center axis W. It is preferable that respective components are designed to be body of rotation symmetrical with respect to the center axis W as shown in this embodiment in order to allow detection sensitivities of acceleration components with respect to a direction in parallel to the XY plane to be uniform. From an ideal point of view, it is preferable to employ a structure such that the supporting means 30 is also rotation symmetrical with respect to the center axis W. In this embodiment, the supporting means 30 is formed by eight springs so that its behavior becomes close to rotation symmetry as far as it is possible.

Figure 3:
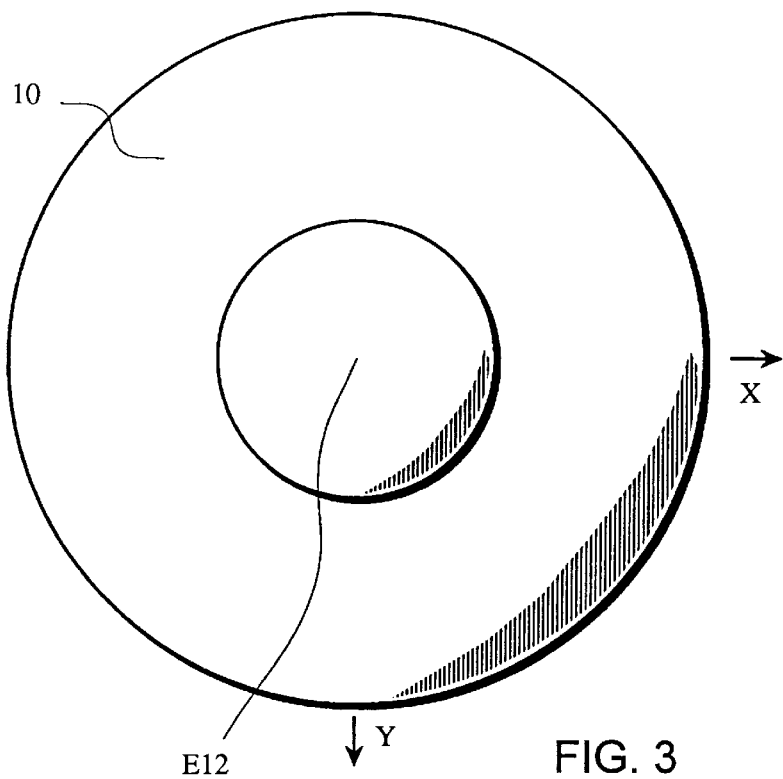
FIG. 3 is a bottom view of the fixed substrate 10 of the acceleration sensor shown in FIG. 1.
Figure 4:
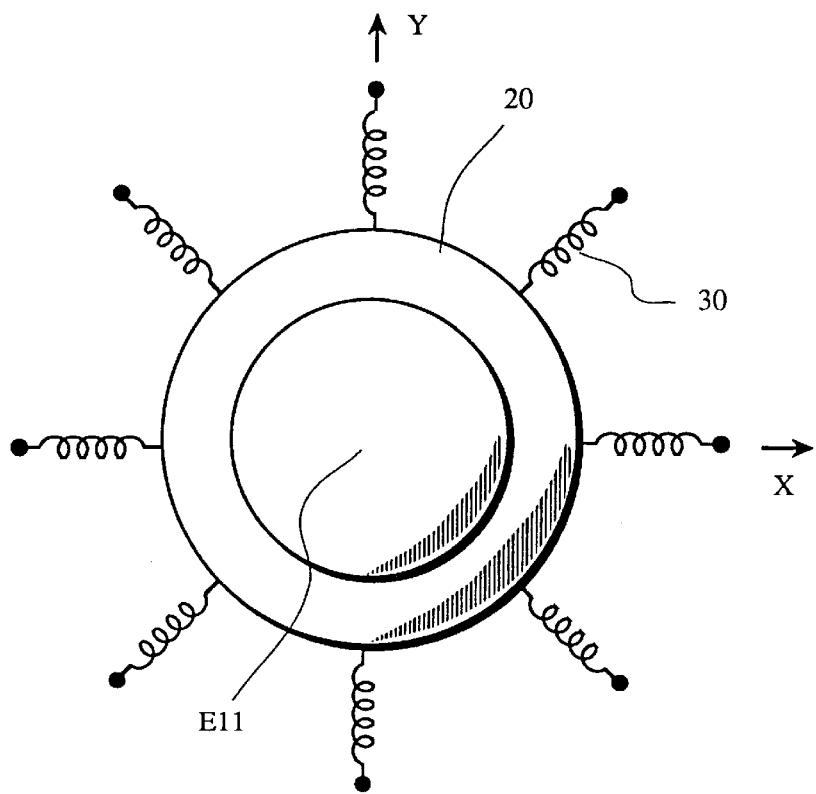
FIG. 4 is a top view of the displacement substrate 20 of the acceleration sensor shown in FIG. 1.

FIG. 3 shows a bottom view of the fixed substrate 10 and FIG. 4 shows a top view of the displacement substrate 20. Both of the fixed electrode E12 shown in FIG. 3 and the fixed electrode E11 shown in FIG. 4 are disk-shaped electrodes, and have a shape to take rotation symmetry with respect to the center axis W shown in FIG. 2. These electrodes are disposed at positions to take rotation symmetry. These electrodes E11, E12 are disposed at positions opposite to each other as shown in FIG. 2, and a capacitance element is formed by such a pair of electrodes. Here, this capacitance element is called first capacitance element C1. On the other hand, as shown in FIGS. 1 and 2, the inside electrode E21 and the outside electrode E22 take "a nested position", and a capacitance element is similarly formed by such a pair of electrodes. Here, this capacitance element is called second capacitance element C2. The important point in this case is that the width in the center axis W direction of the inside electrode E21 is broader than the width in the center axis W direction of the outside electrode E22. In other words, the height of the cylinder serving as the inside electrode E21 is higher than the height of the cylinder serving as the outside electrode E22. The reason why such configuration is employed is that the effective facing areas of both the electrodes become constant even in the case where the weight body 40 is caused to undergo displacement along the center axis W, so that no change takes place in the electrostatic capacitance value of the second capacitance element C2. The detail will be described later.

It is to be noted that while no explanation is particularly given in connection with materials of respective portions constituting the acceleration sensor having the structure indicated in the above fundamental embodiment, it is necessary to constitute at least respective electrodes E11, E12, E21, E22 by conductive material such as metal, etc. In addition, the fixed substrate 10 and the displacement substrate 20 may be constituted with conductive material, or may be constituted with insulating material. In the case where those members are constituted with conductive material, it is necessary to suitably implement insulation in order that no obstacle takes place in the detection operation which will be described later.

§ 2 Phenomenon Taking Place by Longitudinal Vibration

Generally, vibration by earthquake is classified into "longitudinal vibration" and "transverse vibration", and it is known that "longitudinal vibration" is vibration based on P wave and "transverse vibration" is vibration based on S wave. In the seismometer, it is desirable to have ability of respectively independently detecting vibrations based on these both waves. In the case where the acceleration sensor shown in FIGS. 1 and 2 is installed on the ground in the direction as shown in these figures, the "longitudinal vibration" means vibration in the direction along the Z-axis and the "transverse vibration" means vibration in the direction along the XY plane in the XYZ three-dimensional coordinate system. Here, what phenomenon takes place in the acceleration sensor of this invention in the case where vibration based on P wave, i.e., "longitudinal vibration" takes place will be initially studied.

Figure 5:
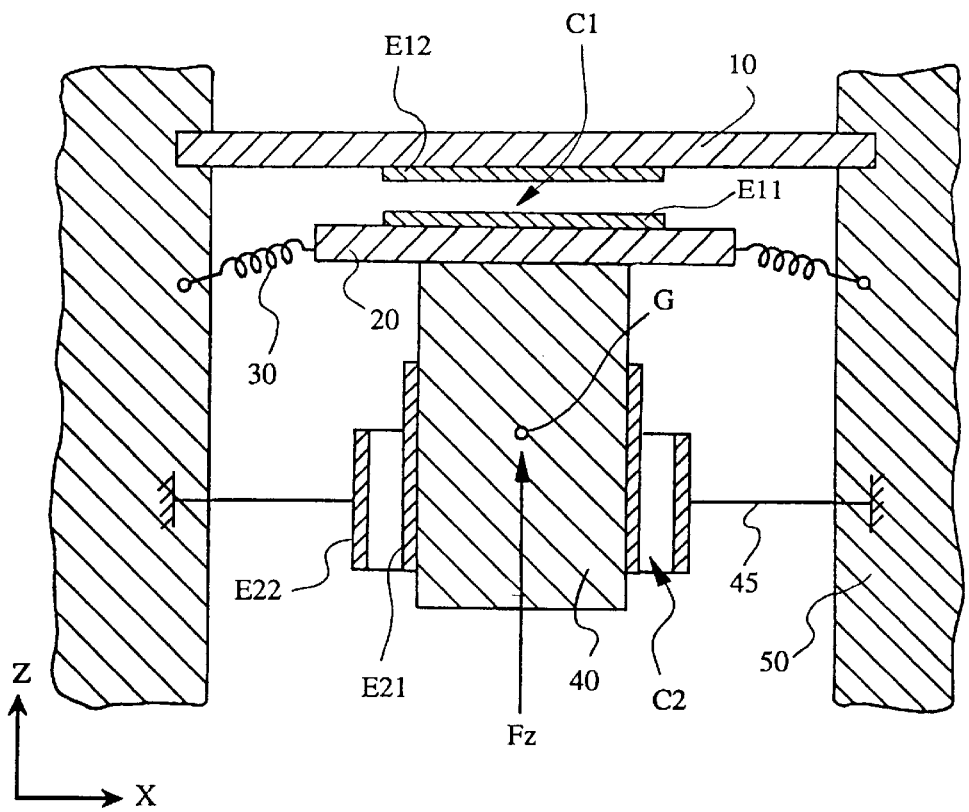
FIG. 5 is a side cross sectional view for explaining the operation when an acceleration component of "longitudinal vibration" is applied to the acceleration sensor shown in FIG. 1.

Let now suppose that an acceleration sensor having a structure as shown in FIG. 2 is installed at a predetermined earthquake observation point, and this earthquake observation point is vibrated in the Z-axis direction. The vibration in the Z-axis direction corresponds to the "longitudinal vibration" based on P wave. When the observation point is vibrated in a reciprocating manner in both positive and negative directions of the Z-axis, the weight body 40 is oscillated in the Z-axis direction within the sensor casing 50. Namely, acceleration $\alpha z$ in the Z-axis direction is applied to the weight body 40. For this reason, force expressed as $Fz=m \cdot \alpha z$ is applied to the center of gravity G of the weight body 40 having mass m. As previously described, the supporting means 30 is caused to undergo elastic deformation by action of such force, so that the displacement substrate 20 is caused to undergo displacement with respect to the fixed substrate 10. The side cross sectional view of FIG. 5 shows the state of displacement of the weight body 40 when force Fz is applied in the Z-axis positive direction. Of course, since the "longitudinal vibration" by earthquake alternately produces acceleration in the Z-axis positive direction and acceleration in the Z-axis negative direction, force Fz in the Z-axis positive direction and force –Fz in the Z-axis negative direction are alternately applied to the weight body 40. FIG. 5 shows the instantaneous state of such a vibration.

Let consider how electrostatic capacitance value of the first capacitance element C1 constituted by the displacement electrode E11 and the fixed electrode E12 varies when the weight body 40 is caused to undergo displacement as shown in FIG. 5. Generally, the electrostatic capacitance value C of the capacitance element is expressed as follows:

$C=\epsilon(S/d)$.

In the above relational expression, $\epsilon$ is dielectric constant of medium (air in this embodiment) existing between both electrodes forming the capacitance element, S is area of the electrode, and d is distance between electrodes. When the state of the displacement substrate 20 changes from the state as shown in FIG. 2 to the state as shown in FIG. 5, the distance d between the electrodes of the first capacitance element C1 becomes small. Accordingly, the electrostatic capacitance value C1 becomes large. In contrast, in the case where force –Fz in the Z-axis negative direction is applied to the weight body 40, the weight body 40 is caused to undergo displacement in the lower direction of the figure, and the distance d between the electrodes of the first capacitance element C1 becomes large. As a result, the electrostatic capacitance value C1 becomes small. Accordingly, when "longitudinal vibration" by earthquake is propagated (transmitted), the weight body 40 is oscillated in upper and lower directions in FIG. 5. As a result, the distance d between the electrodes of the first capacitance element C1 periodically changes in such a manner that it becomes large or small. The amplitude of this change indicates amplitude of vibration of the "longitudinal vibration".

Figure 6:
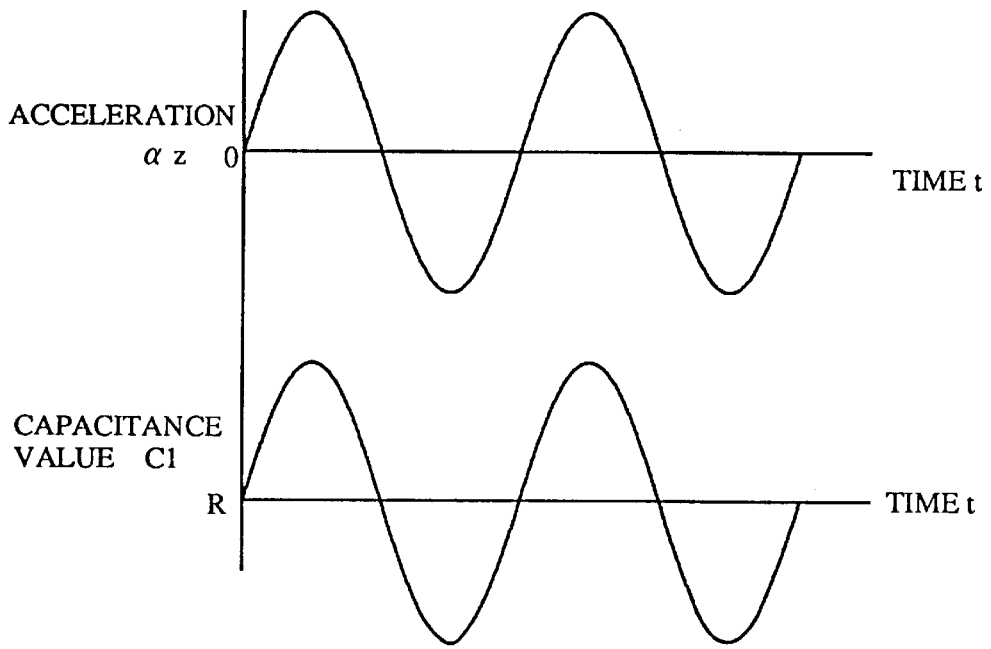
FIG. 6 is a graph showing the relationship between acceleration αz and capacitance value C1 of the first capacitance element in the "longitudinal vibration" state as shown in FIG. 5.

FIG. 6 is a graph showing the relationship between acceleration $\alpha z$ which is vibrational component of the "longitudinal vibration" and the electrostatic capacitance value C1 of the first capacitance element C1. When the acceleration $\alpha z$ is periodically changed by the "longitudinal vibration", the electrostatic capacitance value C1 similarly increases or decreases with the reference value R being as a center. Accordingly, change of the electrostatic capacitance value of the first capacitance element C1 indicates acceleration $\alpha z$ applied in the Z-axis direction, i.e., magnitude of force ±Fz applied in the Z-axis direction. For this reason, if the electrostatic capacitance value of the first capacitance element C1 is electrically taken out as a sensor output, it is possible to provide an acceleration sensor which outputs, as an electric signal, the magnitude of acceleration $\pm \alpha z$ applied in the Z-axis direction, i.e., the magnitude of the "longitudinal vibration" (In practice, not only the magnitude but also instantaneous vibration direction can be recognized). By smoothing the sensor output, it is possible to obtain an average value of vibration. In addition, by integrating the sensor output, it is also possible to obtain an accumulated energy value of vibration.

Meanwhile, when consideration is made as to how the electrostatic capacitance value of the second capacitance element C2 varies in the case where such a "longitudinal vibration" takes place, it is seen that any change does not take place in the electrostatic capacitance value of the second capacitance element C2. When the instantaneous state where force Fz in the Z-axis positive direction is applied to the weight body 40 as shown in FIG. 5, for example, is compared to the reference state shown in FIG. 2, it is seen that any change does not take place in the electrostatic capacitance value of the second capacitance element C2. The reason thereof is as follows. Since the effective facing areas of the inside electrode E21 and the outside electrode E22 is governed by the width in upper and lower directions of the outside electrode E22 at all times, even if the weight body 40 is oscillated in upper and lower directions, any change does not take place in the effective facing areas. FIG. 5 shows the state where the weight body 40 is caused to undergo displacement in upper direction. In contrast, even in the state where the weight body 40 is caused to undergo displacement in lower direction, it is easily understood that the effective opposite areas of the inside electrode E21 and the outside electrode E22 are not changed. There is nothing but that the reason why the width in upper and lower directions of the inside electrode E21 is set to a value broader than the width in upper and lower directions of the outside electrode E22 is that a measure is taken such that the electrostatic capacitance value of the second capacitance element C2 is not changed by "longitudinal vibration".

§ 3 Phenomenon Taking Place by Transverse Vibration

Subsequently, what phenomenon takes place in the acceleration sensor of this invention in the case where vibration based on S wave, i.e., "transverse vibration" takes place will be considered below. "Transverse vibration" is the vibration in the direction along the XY plane in the XYZ three-dimensional coordinate system. Let now suppose that an acceleration sensor of a structure as shown in FIG. 2 is installed at a predetermined earthquake observation point, and this earthquake observation point is vibrated in the X-axis direction. When the observation point is vibrated in reciprocating manner in both the positive and negative directions of the X-axis, the weight body 40 is oscillated along the X-axis within the sensor casing 50. Namely, acceleration αx in the X-axis direction is applied to the weight body 40. For this reason, force expressed as Fx=m·αx is applied to the center of gravity G of the weight body 40 having mass m. As previously described, the supporting means 30 is caused to undergo elastic deformation by action of such a force. As a result, the weight body 40 is caused to undergo displacement within the sensor casing 50.

Figure 7:
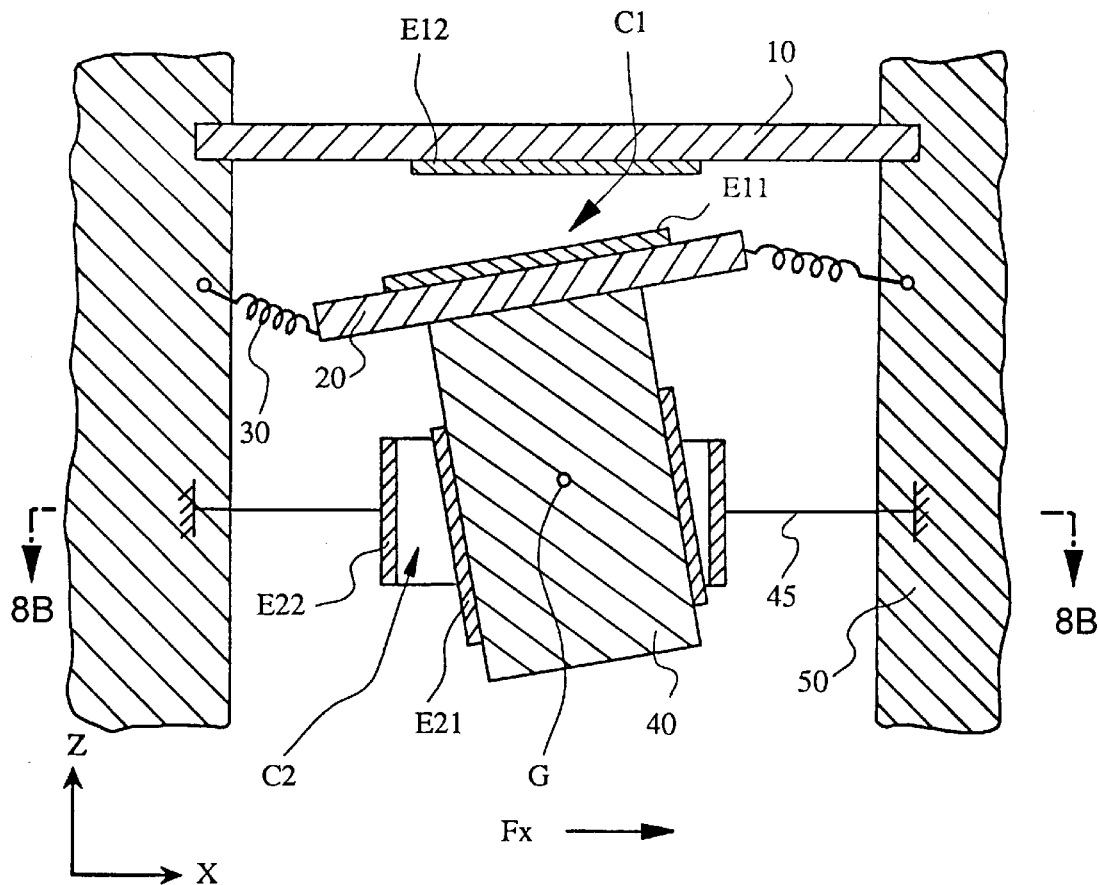
FIG. 7 is a side cross sectional view for explaining the operation when an acceleration component of "transverse vibration" is applied to the acceleration sensor shown in FIG. 1.
Figures 8A, 8B:
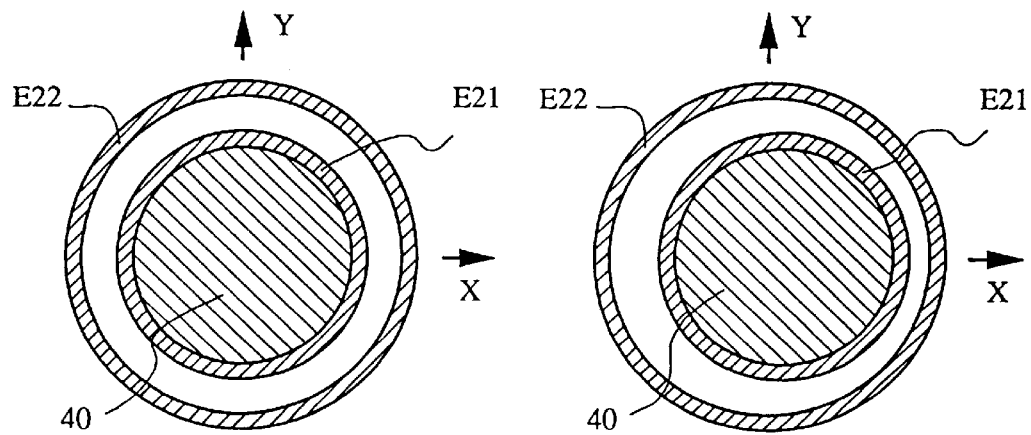
FIGS. 8A and 8B are lateral cross sectional views of the inside electrode E21 and the outside electrode E22 respectively obtained along section lines 8A—8A in FIG. 2 and 8B—8B in FIG. 7.

The side cross sectional view of FIG. 7 shows the displacement state of the weight body 40 when force Fx is applied in the X-axis positive direction. When compared to the reference state shown in FIG. 2, the center of gravity G of the weight body 40 is caused to undergo displacement in the right direction (in the X-axis positive direction) of the figure, and the entirety of the weight body 40 is inclined to the left side. As a result, the displacement electrode E11 is brought into the state inclined with respect to the fixed electrode E12 as shown in the side cross sectional view of FIG. 7. Moreover, the spacing (distance) between the inside electrode E21 and the outside electrode E22 partially produces unbalance. FIG. 8A is a lateral cross sectional view showing the case where this sensor is cut along the cutting plane 8A—8A in the reference state shown in FIG. 2, and FIG. 8B is a lateral cross sectional view showing the case where this sensor is cut along the cutting plane 8B—8B in the "transverse vibration" state shown in FIG. 7. In FIG. 8A, the spacing (distance) between the inside electrode E21 and the outside electrode E22 is uniform. To the contrary, in FIG. 8B, as the result of the fact that the weight body 40 itself is caused to undergo displacement in the right direction (in the X-axis positive direction), the spacing between both the electrodes is narrow at the right side half of the figure and is broad at the left side half of the figure. Of course, since the "transverse vibration" by earthquake alternately produces acceleration in the X-axis positive direction and acceleration in the X-axis negative direction, force Fx in the X-axis positive direction and force −Fx in the X-axis negative direction are alternately applied to the weight body 40. FIGS. 7 and 8B show the instantaneous state in such a vibration.

Let now study what change takes place in the electrostatic capacitance value of the capacitance element constituted by respective opposite electrodes when a change takes place with respect to the positional relationship between the electrodes opposite to each other by such "transverse vibration". Initially, the electrostatic capacitance value of the first capacitance element C1 constituted by the displacement electrode E11 and the fixed electrode E12 will be considered. When the state of the displacement substrate 20 changes from the state as shown in FIG. 2 to the state as shown in FIG. 7, a large change takes place with respect to the distance d between the electrodes in connection with the first capacitance element C1. Namely, in FIG. 7, the distance d between the electrodes E11 and E12 becomes small with respect to the right side half, and it becomes large with respect to the left side half. It is to be noted that since the electrode itself is inclined, a slight change takes place in the effective facing areas of the electrodes. However, since such a change in the areas is very small as compared to the change in the distance, the change in the area of the electrode is assumed to be neglected here.

Figure 9:
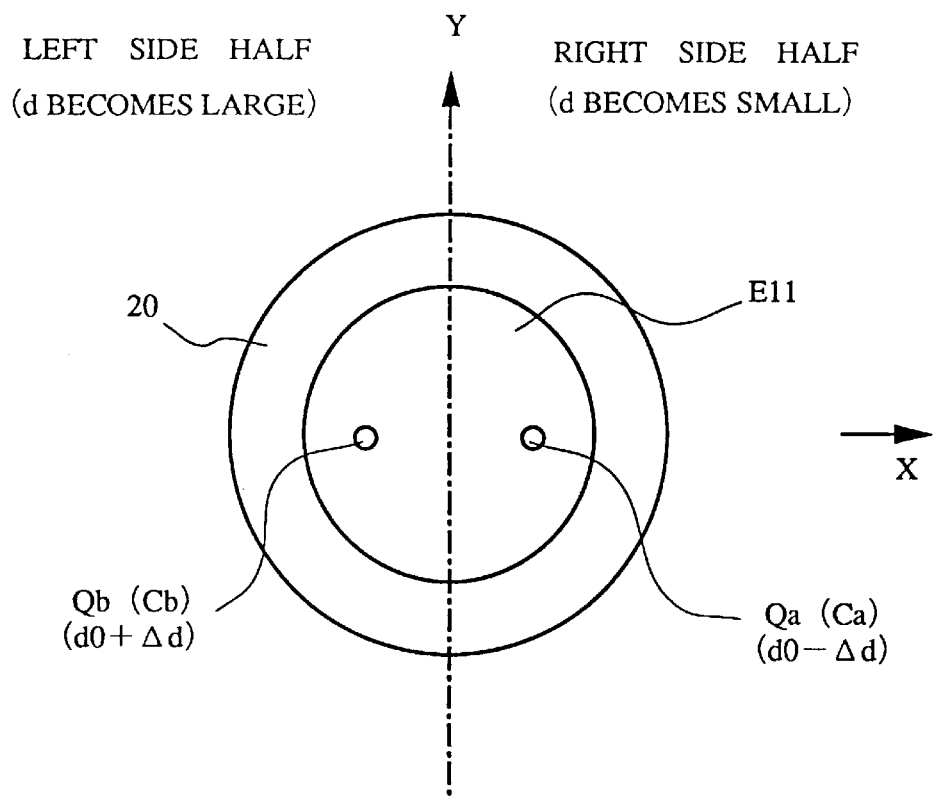
FIG. 9 is a top view of the displacement substrate 20 of the acceleration sensor shown in FIG. 1.

FIG. 9 is a top view of the displacement substrate 20 for indicating the distribution of such changes of distance d between the electrodes. With a single dotted line depicted along the Y-axis being as a boundary line, the distance d between the electrodes becomes small at the right side half of the figure, and it becomes large at the left side half of the figure. Accordingly, when the above-described relational expression of the electrostatic capacitance value C is taken into consideration, the electrostatic capacitance value is increased at the right side half of the figure, and the electrostatic capacitance value is decreased at the left side half of the figure. Meanwhile, since the displacement electrode E11 is of rotation symmetry type with respect to the center axis W (disc-shaped with the center axis W being as a center in this embodiment), the displacement electrode E11 is linearly symmetrical with respect to the single dotted lines of the figure as a matter of course. Accordingly, since even if the electrostatic capacitance value is decreased at the left side half of the figure, the electrostatic capacitance value is increased at the right side half of the figure, a change of the electrostatic capacitance value of the entirety of the first capacitance element C1 seems to be canceled at the left and right sides. As a result, it appears that there is no difference between the electrostatic capacitance value of the first capacitance element C1 in the state shown in FIG. 2 and that in the state shown in FIG. 7.

Figure 10:
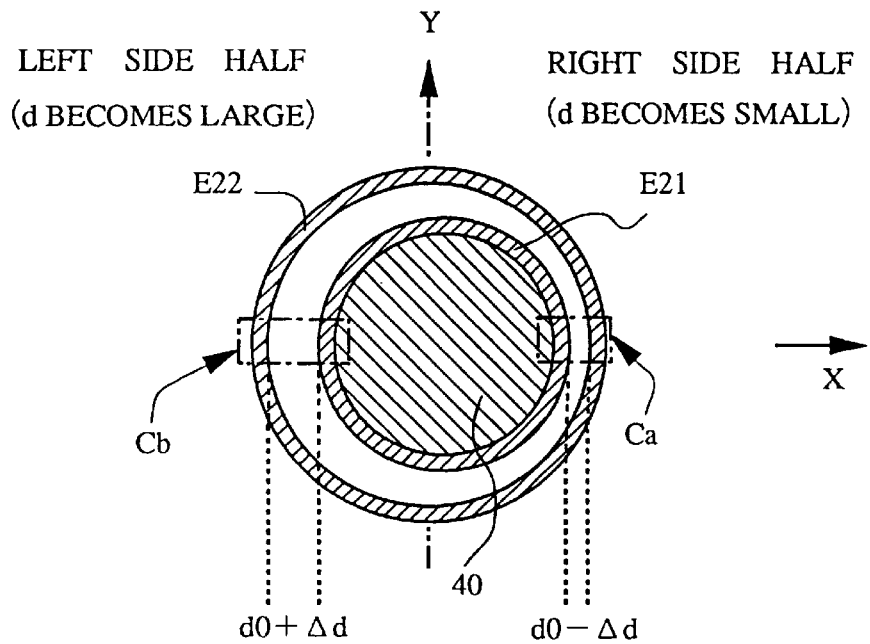
FIG. 10 is a view for explaining change of capacitance value C2 of the second capacitance element with reference to the lateral cross sectional views shown in FIGS. 8A and 8B.

On the other hand, the electrostatic capacitance value of the second capacitance element C2 constituted by the inside electrode E21 and the outside electrode E22 similarly increases at one portion, and decreases at the other portion. Namely, as shown in FIG. 10, with a single dotted line depicted along the Y-axis being as a boundary line, the distance d between the electrodes E21 and E22 becomes small at the right side half of the figure and it becomes large at the left side half of the figure. Accordingly, when the above-described relational expression of the electrostatic capacitance value C is taken into consideration, the electrostatic capacitance value increases at the right side half of the figure, and the electrostatic capacitance value decreases at the left side half of the figure. Meanwhile, since the inside electrode E21 and the outside electrode E22 are both rotation symmetrical with respect to the center axis W (cylindrical with the center axis W being as a central axis in this embodiment), the inside electrode E21 and the outside electrode E22 are both bilaterally symmetrical in the reference state shown in FIG. 8A. Accordingly, since even if the electrostatic capacitance value increases at the right half of the figure, the electrostatic capacitance value decreases at the left half of the figure, a change of the electrostatic capacitance value of the entirety of the second capacitance element C2 seems to be canceled at the left and right sides. As a result, it appears that difference does not take place also in the electrostatic capacitance value of the second capacitance element C2 in both the state shown in FIG. 2 and the state shown in FIG. 7.

However, it will be found that the above-described survey is based on very rough analysis and it is not proper from a view point of detailed analysis. In fact, between the state shown in FIG. 2 and the state shown in FIG. 7, a difference takes place in both the electrostatic capacitance values of the first capacitance element C1 and the second capacitance element C2. The reason thereof will be described below.

Initially, what change takes place in the electrostatic capacitance value of the first capacitance element C1 will be studied in detail. Let now define a very small area Qa in the right side half of the displacement electrode E11, and define a very small area Qb in the left side half thereof as shown in FIG. 9. It is here assumed that the very small area Qa and the very small area Qb exist at the position linearly symmetrical with respect to the Y-axis (single dotted line) and have the same shape and the same area Sq. Let consider how the electrostatic capacitance values of capacitance elements Ca, Cb constituted by these very small areas Qa, Qb and the very small areas on the fixed electrode E12 opposite thereto change.

First, the fixed substrate 10 and the displacement substrate 20 are assumed to be in the state in parallel to each other as shown in FIG. 2. At this time, if the distance between the displacement electrode E11 and the fixed electrode E12 is d0, the electrostatic capacitance value Ca(0) of the capacitance element Ca and the electrostatic capacitance value Cb(0) of the capacitance element Cb are expressed as follows:

Ca(0)=Cb(0)=$\epsilon$(Sq/d0). Thus, they are equal to each other. It is then assumed that, by applying force Fx in the X-axis positive direction to the weight body 40 as shown in FIG. 7, the displacement substrate 20 is inclined with respect to the fixed substrate 10, so that the distance between the very small area Qa and the fixed electrode E12 is shortened by $\Delta$d and the distance between the very small area Qb and the fixed electrode E12 is elongated by $\Delta$d. In this case, the electrostatic capacitance value Ca(+x) of the capacitance element Ca is increased by $\Delta$Ca corresponding to the difference $\Delta$d between the electrodes. On the other hand, the electrostatic capacitance value Cb(+x) of the capacitance element Cb is decreased by $\Delta$Cb corresponding to the difference $\Delta$d between the electrodes. Namely, since the electrostatic capacitance value of the capacitance element Ca is increased by $\Delta$Ca, whereas the electrostatic capacitance value of the capacitance element Cb is decreased by $\Delta$Cb, the increase and the decrease of both the electrostatic capacitance values seem to be canceled. As a result, it appears that there is no change in the total electrostatic capacitance value of the capacitance element Ca and the capacitance element Cb.

Figure 11:
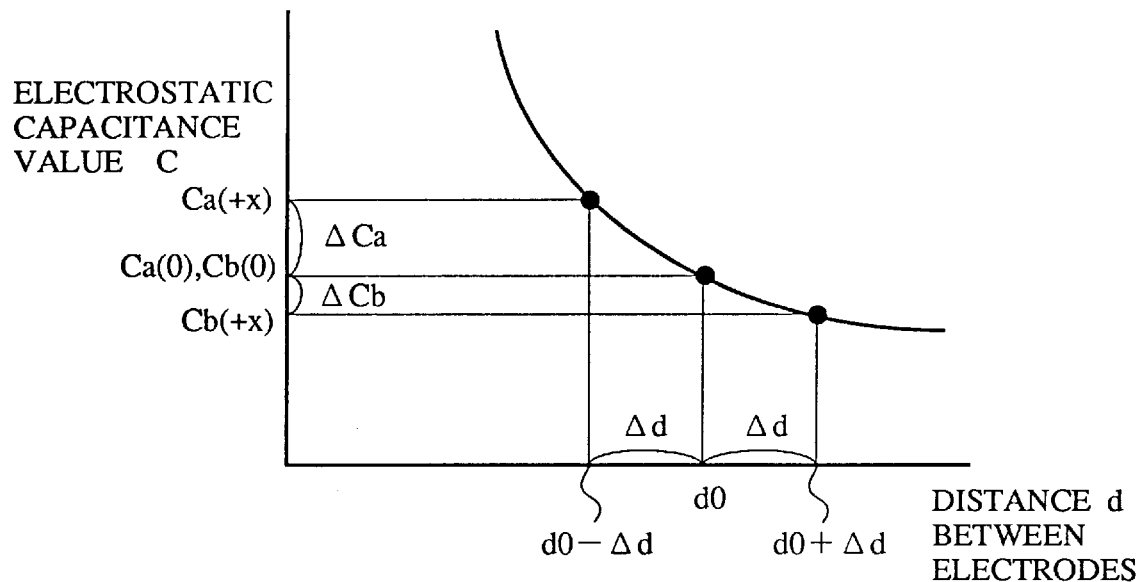
FIG. 11 is a graph showing general relationship between distance d of the electrodes and electrostatic capacitance value C in an electrostatic capacitance element.

However, such a way of thinking is considered to be erroneous. The reason thereof is that $\Delta$Ca and $\Delta$Cb which are changes in the electrostatic capacitance value do not become equal to each other. This can be easily understood when attention is drawn to the graph of FIG. 11. As previously described, an inverse proportional relationship holds between distance d between the electrodes and the electrostatic capacitance value C of the pair of electrodes constituting the capacitance element. When the relationship therebetween is graphically depicted, e.g., a graph of FIG. 11 is obtained. Assuming now that both the substrates are in a state in parallel to each other as shown in FIG. 2, distances between the electrodes of the capacitance elements Ca, Cb are both equal to d0, and electrostatic capacitance values Ca(0), Cb(0) of the capacitance elements Ca, Cb are equal to each other. However, when the displacement substrate 20 is inclined with respect to the fixed substrate 10 by applying force Fx in the X-axis positive direction to the weight body 40, the distance between the electrodes of the capacitance element Ca becomes small, that is, it becomes d0−$\Delta$d. As a result, the electrostatic capacitance value becomes Ca(+x) where Ca(+x)=Ca(0)+$\Delta$Ca. On the other hand, the distance between the electrodes of the capacitance element Cb becomes large, that is, it becomes d0+$\Delta$d. As a result, the electrostatic capacitance value becomes Cb(+x) where Cb(+x)=Cb(0)−$\Delta$Cb. In this case, it is important that although changes $\Delta$d of the distances between the electrodes are equal to each other in both the capacitance elements Ca, Cb, changes $\Delta$Ca, $\Delta$Cb of the electrostatic capacitance values are not equal to each other.

Eventually, in the case where a change from the state shown in FIG. 2 to the state shown in FIG. 7 takes place, the electrostatic capacitance value of the capacitance element Ca constituted by the very small area Qa of the right side is increased by $\Delta$Ca and the electrostatic capacitance value of the capacitance element Cb constituted by the very small area Qb of the left side is decreased by $\Delta$Cb in FIG. 9. In this case, however, $\Delta$Ca and $\Delta$Cb are not equal to each other ($\Delta$Ca>$\Delta$Cb). When attention is drawn to the total electrostatic capacitance value of both the capacitance elements, the electrostatic capacitance value is increased by ($\Delta$Ca−$\Delta$Cb) in total by change from the state of FIG. 2 to the state of FIG. 7.

While discussion has been made in connection with the electrostatic capacitance value of the very small area Qa of the right side half and the electrostatic capacitance value of the very small area Qb of the left side half shown in FIG. 9, since it is considered that such a phenomenon similarly takes place also in connection with the entire area of the right side half and the entire area of the left side half of the displacement electrode E11, it will be understood that the electrostatic capacitance value of the entirety of the first capacitance element C1 constituted by the displacement electrode E11 and the fixed electrode E12 in the state shown in FIG. 7 is increased as compared to that in the state shown in FIG. 2.

While study has been made in connection with the instantaneous state where force Fx in the X-axis positive direction is applied to the weight body 40 as shown in FIG. 7, similar phenomenon takes place also in connection with the instantaneous state where force −Fx in the X-axis negative direction is applied to the weight body 40 in a manner opposite to the above. Namely, in the case where the force −Fx in the X-axis negative direction is applied, there results the state opposite to the state shown in FIG. 7 with respect to the left and right directions. That is, the electrostatic capacitance value at the left side half of the first capacitance element C1 is increased by $\Sigma\Delta$Ca and the capacitance value at the right side half is decreased by $\Sigma\Delta$Cb ($\Sigma$ means sum of changes with respect to respective very small areas). Accordingly, the electrostatic capacitance value of the entirety of the first capacitance element C1 is similarly increased as compared to the state shown in FIG. 2.

Figure 12:
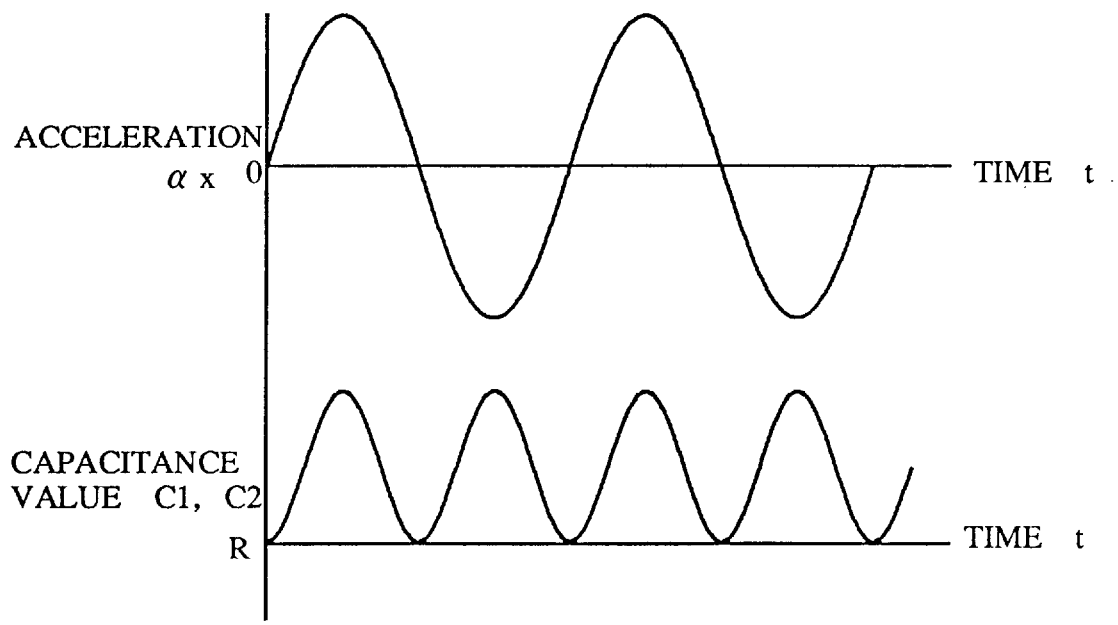
FIG. 12 is a graph showing the relationship between acceleration αx and capacitance value C1 of the first capacitance element and capacitance value C2 of the second capacitance element in the "transverse vibration" state as shown in FIG. 7.

Eventually, change of the electrostatic capacitance value of the first capacitance element C1 constituted by the displacement electrode E11 and the fixed electrode E12 indicates acceleration $\pm\Delta$x applied in the X-axis direction, i.e., magnitude of force $\pm$Fx applied in the X-axis direction. FIG. 12 is a graph showing the relationship between acceleration $\alpha$x which is the vibrational component of "transverse vibration" and electrostatic capacitance value C1 of the first capacitance element C1. When the acceleration $\alpha$x periodically changes by the "transverse vibration", the electrostatic capacitance value C1 similarly periodically changes. It is to be noted that this change in the capacitance value takes place only in an increasing direction from the reference value R at all the times as shown in FIG. 12 and it is different from the periodical change in case of the "longitudinal vibration" as shown in FIG. 6. Therefore, in the case of the "transverse vibration", the absolute value of amplitude can be obtained as change of the electrostatic capacitance value C1, but its direction cannot be recognized. When the electrostatic capacitance value of the first capacitance element C1 is electrically taken out as a sensor output, it is possible to realize an acceleration sensor which detect a magnitude of acceleration $\pm\alpha$x applied in the X-axis direction, i.e., a magnitude of the "transverse vibration". If the change of the sensor output is smoothed, an average value of vibration can be obtained and if the change of the sensor output is integrated, an accumulated energy value of vibration can be also obtained.

Meanwhile, exactly the same phenomenon as described above will take place also in the second capacitance element C2. Here, a very small capacitance element Ca comprised of a pair of very small areas is defined on the positive axis of the X-axis in FIG. 10 and a very small capacitance element Cb comprised of a pair of very small areas is defined on the negative axis of the X-axis in FIG. 10, and the changes of the electrostatic capacitance values of these capacitance elements Ca, Cb are considered. Assuming now that the distance between the inside electrode E21 and the outside electrode E22 takes the same value of d0 at any portion in the reference state as shown in FIG. 8A, and the electrostatic capacitance value Ca(0) of the capacitance element Ca and the electrostatic capacitance value Cb(0) of the capacitance element Cb are equal to each other. When the weight body 40 is moved in the right direction as shown in FIG. 10 by applying force Fx in the X-axis positive direction to the weight body 40, the distance between the electrodes of the capacitance element Ca of the right side half is shortened by $\Delta d$, and the distance between the electrodes of the capacitance element Cb of the left side half is elongated by $\Delta d$. In this case, the electrostatic capacitance value of the capacitance element Ca becomes Ca(+x)=Ca(0)+$\Delta$Ca, where $\Delta$Ca corresponds to the difference $\Delta d$ of the electrode distance. On the other hand, the electrostatic capacitance value of the capacitance element Cb becomes Cb(+x)=Cb(0)−$\Delta$Cb, where $\Delta$Cb corresponds to the difference $\Delta d$ of the electrode distance.

As previously described with reference to the graph of FIG. 11, the values $\Delta$Ca and $\Delta$Cb which are changes of the electrostatic capacitance value are not equal to each other, but have the relation expressed as $\Delta Ca > \Delta Cb$. Therefore, when attention is drawn to sum of the electrostatic capacitance value of the capacitance element Ca and the electrostatic capacitance value of the capacitance element Cb, the sum "Ca(+x)+Cb(+x)" in the state where the weight body 40 is caused to undergo displacement in the X-axis positive direction is increased by value of ($\Delta$Ca−$\Delta$Cb) as compared to the sum "Ca(0)+Cb(0)" in the reference state. When it is considered that such a phenomenon takes place in connection with the entire area of the right side half and the entire area of the left side half of the capacitance element C2 composed of the inside electrode E21 and the outside electrode E22, it can be understood that the electrostatic capacitance value of the entirety of the second capacitance element C2 in the state shown in FIG. 7 is increased as compared to that in the state shown in FIG. 2. Of course, similar phenomenon takes place also in connection with the instantaneous state where force −Fx in the X-axis negative direction is applied to the weight body 40.

Eventually, the change of the electrostatic capacitance value as shown in FIG. 12 takes place in both the first capacitance element C1 and the second capacitance element C2 with respect to the acceleration $\alpha x$ which is the vibrational component of the "transverse vibration". From a practical point of view, as will be described in the following chapter § 4, in the acceleration sensor according to this invention, "longitudinal vibration" is detected by the first capacitance element C1 and "transverse vibration" is detected by the second capacitance element C2. Accordingly, it is preferable that the sensitivity for the electrostatic capacitance value of the second capacitance element C2 with respect to the "transverse vibration" is set to a higher value and the sensitivity for the electrostatic capacitance value of the first capacitance element C1 with respect to the "transverse vibration" is set to a lower value. In other words, it is preferable that an approach is employed such that when a "transverse vibration" takes place, the electrostatic capacitance value is caused to be changed to much degree with respect to the second capacitance element C2 so that effective detection of the "transverse vibration" can be made, while change of the electrostatic capacitance value is caused to be as small as possible with respect to the first capacitance element C1 so that the component of the "transverse vibration" interferes with the detection result of the "longitudinal vibration" as minimum as possible. In more practical sense, if the length in the axial direction of the weight body 40 is set to a longer value to some degree so that the second capacitance element C2 is provided at a portion as low as possible of the weight body 40, it is possible to make the detection sensitivity of the "transverse vibration" of the second capacitance element C2 higher than that of the first capacitance element C1.

§ 4 Detection Circuit for Acceleration

Figure 13:
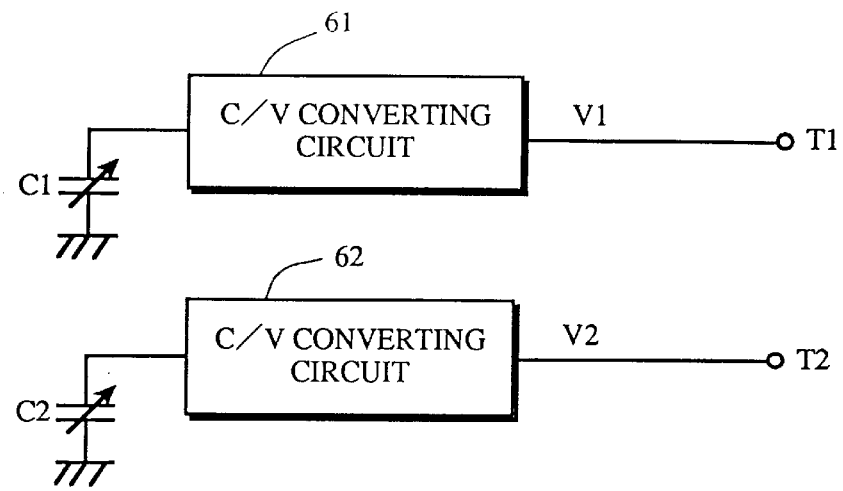
FIG. 13 is a circuit diagram showing a detection circuit used for the acceleration sensor shown in FIG. 1.

In order to detect acceleration of "longitudinal vibration" and acceleration of "transverse vibration" by the acceleration sensor shown in FIGS. 1 and 2, it is sufficient to prepare a detection circuit as shown in FIG. 13. In this detection circuit, the element C1 is the first capacitance element C1 constituted by the displacement electrode E11 and the fixed electrode E12, and the element C2 is the second capacitance element C2 constituted by the inside electrode E21 and the outside electrode E22. Moreover, C/V converting circuits 61, 62 are circuits for respectively converting electrostatic capacitance values C1, C2 of the respective capacitance elements into voltage values V1, V2. Eventually, if this detection circuit is used, an electrostatic capacitance value of the first capacitance element C1 is outputted to an output terminal T1 as a voltage V1, and an electrostatic capacitance value of the second capacitance element C2 is outputted to an output terminal T2 as a voltage V2.

Let now consider what physical action is meant by the voltages V1, V2 obtained on the respective output terminals T1, T2 of this detection circuit. Initially, let consider the phenomenon when the "longitudinal vibration" described in the chapter § 2 takes place. When the "longitudinal vibration" takes place, an acceleration $\alpha z$ in the Z-axis direction alternately takes positive and negative values as indicated by the upper graph of FIG. 6. In the state where the acceleration $\alpha z$ as indicated by the upper graph of FIG. 6 is applied, the change of the capacitance value C1 as indicated by the lower graph of FIG. 6 is obtained with respect to the first capacitance element C1. Accordingly, a voltage V1 obtained at the output terminal T1 indicates the acceleration $\alpha z$ itself. In short, the amplitude of the voltage V1 indicates the magnitude of the acceleration $\alpha z$, i.e., the amplitude of the longitudinal vibration, and the polarity of the voltage V1 indicates direction of the acceleration $\alpha z$ at the instantaneous time. On the other hand, with respect to such a "longitudinal vibration", as previously described, no change takes place in the electrostatic capacitance value of the second capacitance element C2. Thus, the voltage V2 obtained at the output terminal T2 takes a constant fixed value which is not dependent upon the "longitudinal vibration".

Subsequently, let consider the phenomenon when the "transverse vibration" described in the chapter § 3 takes place. For example, when a "transverse vibration" with respect to the X-axis direction takes place, an acceleration $\alpha x$ in the X-axis direction alternately takes positive and negative values as indicated by the upper graph of FIG. 12. In the state where an acceleration $\alpha x$ as indicated by the upper graph of FIG. 12 is applied, changes in capacitance values C1, C2 as indicated by the lower graph of FIG. 12 are obtained with respect to both the first and second capacitance elements C1 and C2. Accordingly, the voltage V1 obtained at the output terminal T1 and the voltage V2 obtained at the output terminal T2 both indicate the acceleration αx. In short, the amplitude of the voltages indicates the magnitude of the acceleration αx, i.e., the amplitude of the "transverse vibration". It is to be noted that since these voltages (capacitances) are proportional to a square of the acceleration αx as shown in the lower graph of FIG. 12 and take always a greater value than the reference voltage R irrespective of the direction of the acceleration αx, information relating to the "direction" of the acceleration αx at the moment cannot be obtained.

While what phenomenon takes place has been described above on the assumption that the acceleration ±αx in the X-axis direction is applied as the "transverse vibration", such phenomenon is not the phenomenon taking place only when the acceleration ±αx in the X-axis direction is applied, but general phenomenon taking place when an acceleration component with respect to any direction along the XY plane is applied. That is, as previously described, since the respective electrodes E11, E12, E21, E22 are all rotation symmetrical with respect to the center axis W, also in the case where acceleration ±αy in the Y-axis direction is applied, entirely the same phenomenon takes place. Similarly, in the case where an acceleration relating to arbitrary direction included within the XY plane is applied, entirely the same phenomenon takes place.

Eventually, in the detection circuit shown in FIG. 13, a voltage V2 obtained at the output terminal T2 becomes equal to a value which indicates the amplitude component of only the "transverse vibration" which is not influenced by the effect of the "longitudinal vibration". Accordingly, a change of the voltage V2 can be used as it is as a detection value indicating "transverse vibration amplitude" in this acceleration sensor.

On the other hand, a voltage V1 obtained at the output terminal T1 indicates a sum of the amplitude component of "longitudinal vibration" and the amplitude component of "transverse vibration". In practice, the latter takes a very small value as compared to the former by the following reason. First, in the case where the "longitudinal vibration" takes place, the spacing (distance) between the displacement electrode E11 and the fixed electrode E12 uniformly changes in the entire region of these electrodes as shown in FIG. 5. Namely, changes Δd of the spacings are equal to each other in all regions of the electrodes. In addition, since the change Δd is directly exerted on change of the electrostatic capacitance value C1, the voltage V1 effectively fluctuates by the "longitudinal vibration". On the contrary, in the case where the "transverse vibration" takes place, the distance (spacing) d between the displacement electrode E11 and the fixed electrode E12 is widened or contracted depending on the position as shown in FIG. 7. In addition, the amount of the change Δd at the central portion becomes extremely small as compared to that at the peripheral portion of the disk-shaped electrode. Namely, changes Δd of spacings (distances) are different from each other in both sign and magnitude at respective portions of the electrode. Further, such a change Δd does not directly contribute to change the electrostatic capacitance value C1. As has been explained with reference to the graph of FIG. 11, the total electrostatic capacitance value is increased by only (ΔCa−ΔCb), where the incremental value ΔCa of the electrostatic capacitance is obtained by the fact that the electrode spacing changes from d0 to (d0−Δd) and the decrement value ΔCb of the electrostatic capacitance is obtained by the fact that the electrode spacing changes from d0 to (d0+Δd).

For the reasons stated above, a change of the voltage V1 obtained at the output terminal T1 mainly indicates the amplitude component of the "longitudinal vibration". Even if a change of the voltage V1 is used as it is as a detection value indicating the "longitudinal vibration amplitude" in this acceleration sensor, there is no problem in practice. Therefore, when the detection circuit as shown in FIG. 13 is prepared, it is possible to detect an amplitude of the "longitudinal vibration" as an amplitude of the voltage at the output terminal T1 and to detect an amplitude of the "transverse vibration" as an amplitude of the voltage at the output terminal T2. It is to be noted that if a calibration is made such that the output voltage becomes 0 volts when the acceleration to be detected is zero, a voltage values obtained at the output terminals T1, T2 can be used as they are as values indicating the amplitude of the detected acceleration.

As previously described, in the conventional three-dimensional acceleration sensor, it was possible to detect not only the amplitude but also the direction of acceleration with respect to the "transverse vibration". However, it is sufficient for the purpose of carrying out supply control of the city gas or operation control of an elevator to provide an acceleration sensor capable of detecting only the amplitude. That is, it is sufficient if the sensor could detect whether or not the amplitude of the "transverse vibration" exceeds a predetermined threshold. Similarly, it is sufficient for the purpose of carrying out operation control of an air bag system in the automotive vehicle to provide an acceleration sensor capable of detecting whether or not the collision impact, which is applied from the front, the back or the side, exceeds a predetermined threshold. The acceleration sensor according to this invention sufficiently satisfies such conditions. In addition, its detection output can be directly obtained as an electrostatic capacitance value of the second capacitance element C2. Thus, the necessary acceleration detection can be made by the very simple configuration.

§ 5 Higher Accuracy Detection Circuit

Figure 14:
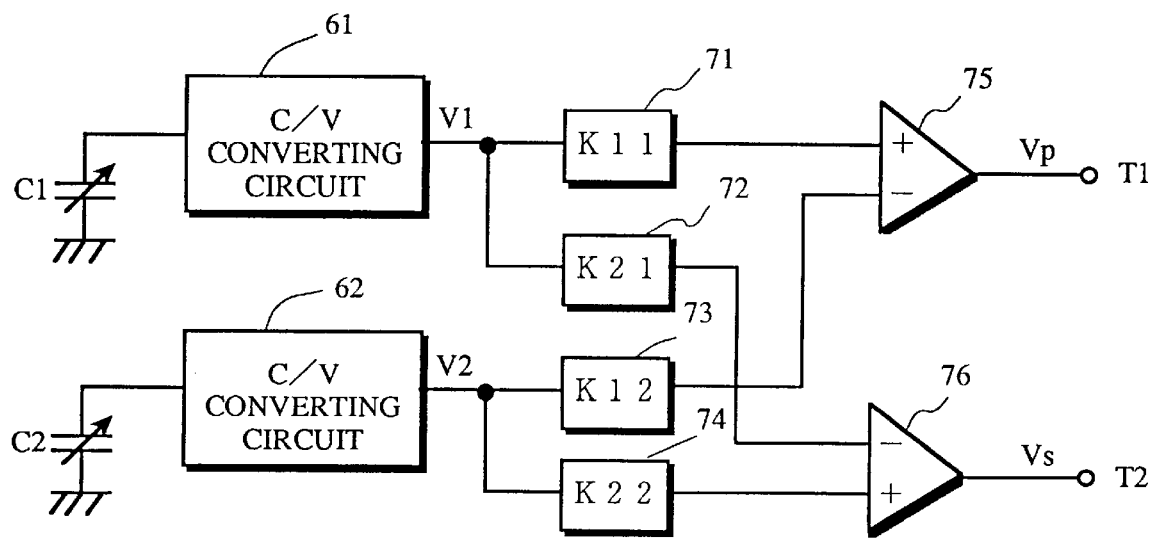
FIG. 14 is a circuit diagram showing a higher accuracy detection circuit used for the acceleration sensor shown in FIG. 1.

It has been described in the chapter § 4 that the acceleration sensor which is sufficient from a viewpoint of practical use can be obtained by using a detection circuit as shown in FIG. 13. However, in order to carry out higher accuracy detection, it is preferable to use a detection circuit as shown in FIG. 14. In this detection circuit, the multiplication circuits 71 to 74 and the differential amplifiers 75, 76 are further added to the detection circuit shown in FIG. 13 in order to make correction with respect to the voltages V1 and V2, thereby making it possible to output a correct voltage Vp indicating the "longitudinal vibration" to the output terminal T1, and to output correct voltage Vs indicating the "transverse vibration" to the output terminal T2.

When it is assumed that the voltages V1 and V2 are the sum of the component indicating the amplitude of the "longitudinal vibration" (corresponding to voltage Vp) and the component indicating the amplitude of the "transverse vibration" (corresponding to voltage Vs), the following two equations hold:

$V1 = M11 \cdot Vp + M12 \cdot Vs$, $V2 = M21 \cdot Vp + M22 \cdot Vs$.

In the above equations, M11, M12, M21, M22 are respectively predetermined proportional constants. The detection circuit described in the chapter § 4 is based on the assumption that the constant M21 is caused to be equal to zero, and the constant M12 is caused to be approximate to zero because the constant M12 is very small as compared to the constant M11. In the detection circuit described in the chapter § 4, under the above assumption, the following equations are used to output the voltages Vp and Vs.

V1=M11·Vp,

V2=M22·Vs.

However, in a precise point of view, the constant M12 is not equal to zero. In addition, though the constant M21 becomes equal to zero from a theoretical point of view, the actual constant M21 does not equal to zero because of practical or mechanical errors, etc. which cannot be avoided in the actual device. Here, the explanation will be given in connection with a method based on the assumption that the proportional constants M11, M12, M21, M22 are not equal to zero to thereby obtain rigorous detection values. In the following two simultaneous equations, V1=M11·Vp+M12·Vs, V2=M21·Vp+M22·Vs, since the voltage values V1 and V2 are values obtained as actually measured values, and M11, M12, M21, M22 are proportional constants having predetermined values, unknown quantities are only Vp and Vs. Accordingly, if these two simultaneous equations are solved, solution of the unknown quantities can be obtained. In order to carry out the operation to obtain the solution by an analog circuit, it is sufficient to employ the following procedure from a practical point of view. When the above-described two simultaneous equations are expressed by a determinant, the following expression is provided.

$$\begin{bmatrix} V1 \\ V2 \end{bmatrix} = \begin{bmatrix} M11 & M12 \\ M21 & M22 \end{bmatrix} \begin{bmatrix} Vp \\ Vs \end{bmatrix}$$

When this determinant is solved in connection with Vp, Vs, the following determinant is obtained.

$$\begin{bmatrix} Vp \\ Vs \end{bmatrix} = \begin{bmatrix} M11 & M12 \\ M21 & M22 \end{bmatrix}^{-1} \begin{bmatrix} V1 \\ V2 \end{bmatrix}$$
$$= \begin{bmatrix} K11 & -K12 \\ -K21 & K22 \end{bmatrix} \begin{bmatrix} V1 \\ V2 \end{bmatrix}$$

In the above determinant, K11, K12, K21, K22 are elements of the inverse matrix with respect to the matrix in which M11, M12, M21, M22 are the elements. In view of this, the inverse matrix is determined by an operation to determine the respective values of the elements K11, K12, K21, K22. Further, the multiplication circuits 71 to 74 respectively having the values K11, K12, K21, K22 as a multiplication constant are prepared to assemble a detection circuit and the differential amplifiers 75, 76 are prepared as shown in FIG. 14. Thus, the operation expressed below is carried out.

Vp=K11·V1−K12·V2

Vs=−K21·V1+K22·V2.

This is nothing but the operation of the above-described determinant using the inverse matrix. Thus, in accordance with the analog operation circuit shown in FIG. 14, the voltage Vp obtained at the output terminal T1 indicates a rigorous amplitude value of the "longitudinal vibration" and the voltage Vs obtained at the output terminal T2 indicates a rigorous amplitude value of the "transverse vibration".

§ 6 Other Embodiments

Figure 15:
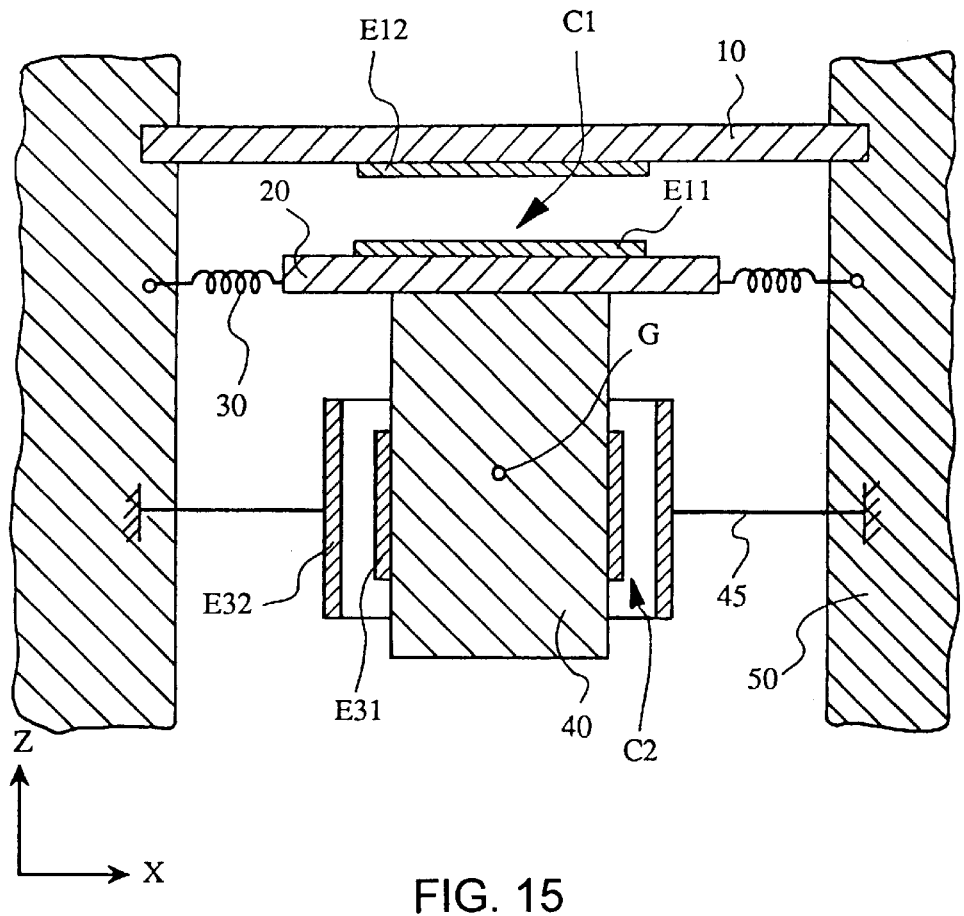
FIG. 15 is a side cross sectional view showing a different embodiment of the acceleration sensor according to this invention.

While the acceleration sensor according to this invention has been described in accordance with the fundamental embodiments, this invention is not limited to these embodiments, but may be carried out in various forms in addition to the above. For example, in the above-described embodiment, there was adapted the particular structure that the width of the inside electrode E21 (width in the center axis W direction) is set to be broader as compared to that of the outside electrode E22. By adapting this particular structure, even if the weight body 40 is caused to move in the center axis W direction by the acceleration component of the "longitudinal vibration", the effective facing areas of the second capacitance element C2 are kept constant. On the contrary to the above particular structure, as shown in FIG. 15, another particular structure can be adapted in which the width of an outside electrode E32 is set to be broader as compared to that of an inside electrode E31. In short, it is sufficient to employ a configuration in which the effective facing areas of the inside electrode and the outside electrode are kept constant even in the case where the weight body 40 is caused to undergo displacement along the center axis W. In other words, with respect to the width of the inside electrode and the outside electrode in the center axis direction, it is sufficient that one width is caused to be broader than the other width at least by a maximum expected displacement of the weight body 40 along the center axis W.

Moreover, while the displacement electrode E11 and the fixed electrode E12 are constituted by the disk-shaped electrode of the same diameter in the above-described embodiments, one diameter may be greater than the other diameter. In this case, the effective facing areas are determined by the electrode of smaller diameter.

Further, the above-described embodiments were directed to the acceleration sensor provided with both the first capacitance element C1 for detecting the "longitudinal vibration" and the second capacitance element C2 for detecting the "transverse vibration". However, if the sensor is used in an environment such that only the "transverse vibration" takes place, it is sufficient to provide only the second capacitance element C2. For example, in the case where an acceleration sensor is utilized as an impact meter mounted on an automotive vehicle, only the impact component of the "transverse vibration" ordinarily takes place in the case of collision between automotive vehicles or collision between automotive vehicle and building, etc. Therefore, the impact component of the "longitudinal vibration" can be neglected. Since there is no necessity of carrying out detection with respect to the "longitudinal vibration" component in such an environment, it is sufficient to provide only the second capacitance element C2. Namely, in the acceleration sensor shown in FIG. 2, the displacement electrode E11 and the fixed electrode E12 can be omitted.

Moreover, while the respective electrodes are completely rotation symmetrical with respect to the center axis W, it is not necessarily required from a practical point of view that they are completely rotation symmetrical. However, it is to be noted that if the displacement electrode E11 and the fixed electrode E12 are rotation symmetrical (circular) with respect to the center axis W, it is possible to hold the change of the electrostatic capacitance value based on the "transverse vibration" down to a value as low as possible. Accordingly, even if the simple detection circuit shown in FIG. 13 is used, it becomes possible to obtain a reasonable detection result for the "longitudinal vibration" which includes the burdensome component of the "transverse vibration" as minimum as possible. Moreover, if the inside electrode E21 and the outside electrode E22 are rotation symmetrical (cylindrical) with respect to the center axis W, a non-directional detection for the "transverse vibration" can be made. In other words, the detection can be made with the same sensitivity with respect to an acceleration in any direction of 360 degrees on the XY plane. This is the ideal property when such an acceleration sensor is used as a seismometer.

Figure 16:
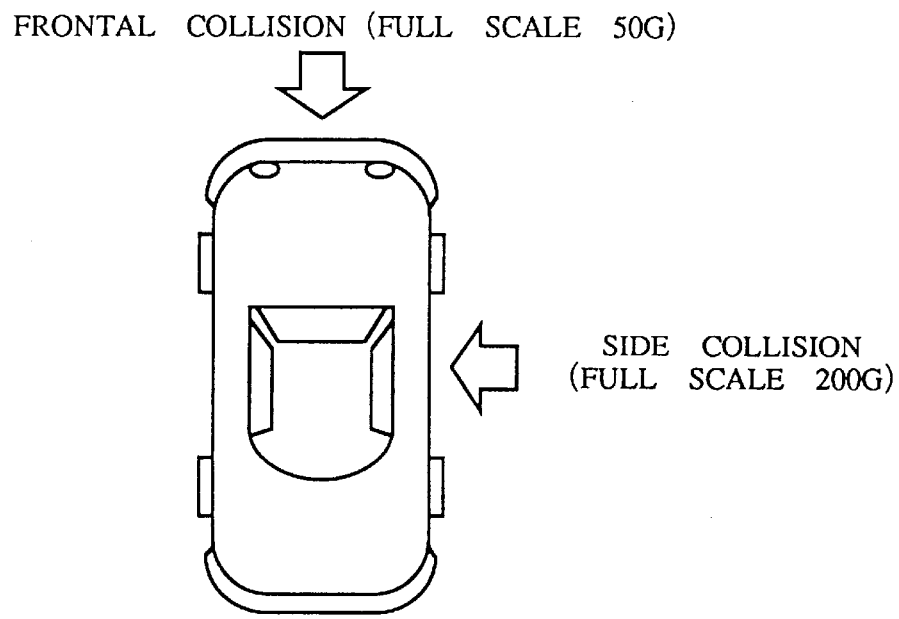
FIG. 16 is a view for explaining directional dependence of detection sensitivity in the case where the acceleration sensor according to this invention is used as an impact sensor for collision of automotive vehicle.

Nevertheless, it is also to be noted that there are instances where it is preferable to intensionally make a directional detection (a detection having difference sensitivity depending on direction) for the "transverse vibration". For example, in the case where such an acceleration sensor is used as an impact sensor for carrying out the operation control of an air bag system in an automotive vehicle, it is preferable to provide different detection sensitivities between for detecting impact by the frontal collision and for detecting impact by the side collision. This is because the impact acceleration applied to the driver's seat generally has a tendency such that the impact acceleration at the time of the side collision is greater than that at the time of the frontal collision as shown in FIG. 16. In more practical sense, it is considered that, as an acceleration sensor mounted in an automotive vehicle, the full scale for detecting the impact acceleration by the frontal collision is required to be about 50 G, whereas the full scale for detecting the impact acceleration by the side collision is required to be about 200 G. To meet with such demand, it is necessary to allow the detection sensitivity with respect to acceleration applied from the side surface to be lower than the detection sensitivity with respect to acceleration applied from the front.

Figure 17A:
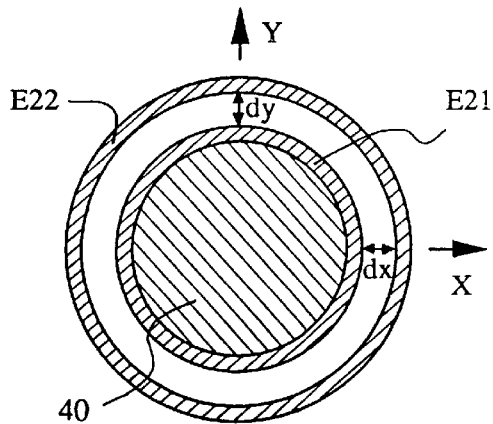
FIGS. 17A and 17B are views showing the structure of the inside electrode E21 and the outside electrode E22 in the acceleration sensor shown in FIG. 1, and sensitivity distribution curve S0 obtained by the above-mentioned structure.
Figure 17B:
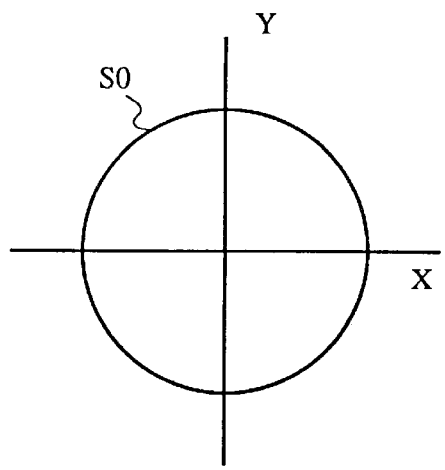

In order to provide a directional sensitivity for detecting the "transverse vibration", it is sufficient to make a setting such that the spacing (distance) between the inside electrode and the outside electrode is partially different in the reference state where an acceleration to be detected is not applied. FIG. 17A is a lateral cross sectional view showing the positional relationship between the inside electrode E21 and the outside electrode E22 in the sensors according to the embodiments which have been described above. In this example, the distance dx between both the electrodes on the X-axis and the distance dy between both the electrodes on the Y-axis are equal to each other, and the distance between both the electrodes is uniform not only on the X-axis and the Y-axis but also at all positions. This is because the inside electrode E21 and the outside electrode E22 are coaxially cylindrical. In the case where the electrode of such a structure is used, the detection sensitivity with respect to the "transverse vibration" on the XY-plane is the same with respect to all directions as indicated by the sensitivity distribution curve SO in FIG. 17B.

Figure 18A:
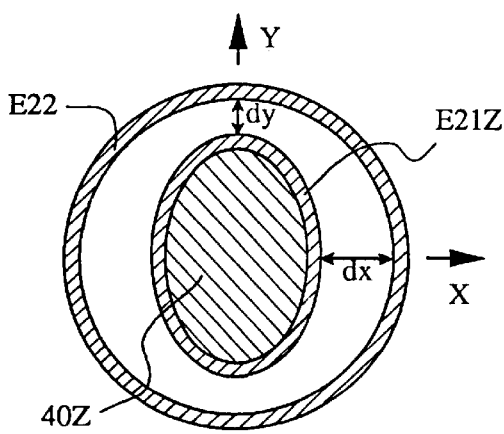
FIGS. 18A and 18B are views showing the structure using the elliptic cylindrical inside electrode E21Z in place of the inside electrode E21 in the structure shown in FIG. 17A, and sensitivity distribution curve S1 obtained by the above-mentioned structure.
Figure 18B:
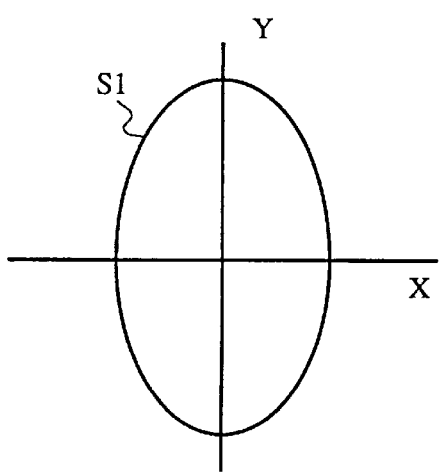
Figure 19A:
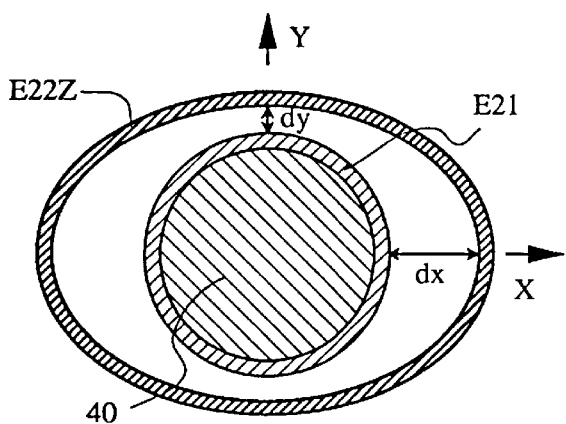
FIGS. 19A and 19B are views showing the structure using the elliptic cylindrical outside electrode E22Z in place of the outside electrode E22 in the structure shown in FIG. 17A, and sensitivity distribution curve S2 obtained by the above-mentioned structure.
Figure 19B:
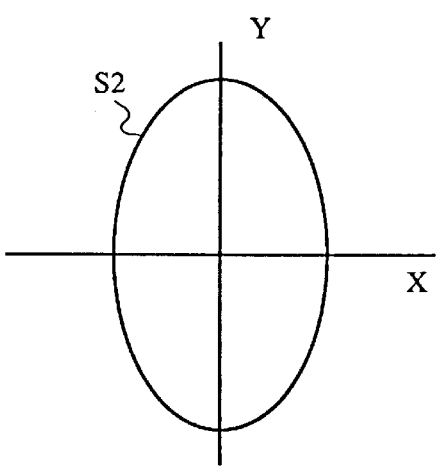

On the contrary, if an elliptic columnar weight body 40Z is used as shown in FIG. 18A, in place of the columnar weight body 40, to form an elliptic cylindrical inside electrode E21Z on the surface thereof, the distance (spacing) dx between both the electrodes on the X-axis is broader than the distance (spacing) dy between both the electrodes on the Y-axis. As a result, the detection sensitivity with respect to the "transverse vibration" on the XY plane is such that the sensitivity becomes high with respect to the Y-axis direction and the sensitivity becomes low with respect to the X-axis direction as indicated by the sensitivity distribution curve S1 in FIG. 18B. FIG. 19A shows another embodiment where the weight body 40 is caused to remain columnar to form the cylindrical inside electrode E21 on the surface thereof, although an elliptic cylindrical outside electrode E22Z is provided. In this embodiment, the distance dx between both the electrodes on the X-axis is broader than the distance dy between both the electrodes on the Y-axis. Thus, the detection sensitivity with respect to the "transverse vibration" on the XY plane is such that the sensitivity is high with respect to the Y-axis direction and the sensitivity is low with respect to the X-axis direction as indicated by the sensitivity distribution curve S2 in FIG. 19B.

AS stated above, in the acceleration sensor according to this invention, it is possible to set detection sensitivity with respect to the "transverse vibration" in dependency upon use purpose.

§ 7 More Practical Embodiments

Subsequently, more practical embodiment of the acceleration sensor according to this invention will be described. In the acceleration sensors according to the embodiments which have been described until now, the periphery of the displacement substrate 20 is supported by the supporting means 30 composed of eight springs. However, such a structure is not necessarily optimum for the purpose of realization of more practical acceleration sensors suitable for mass production. Here, there is disclosed a more practical embodiment in which plural slits are formed on a flexible substrate to thereby constitute a diaphragm which functions as the displacement substrate 20 and the supporting means 30.

Figure 20:
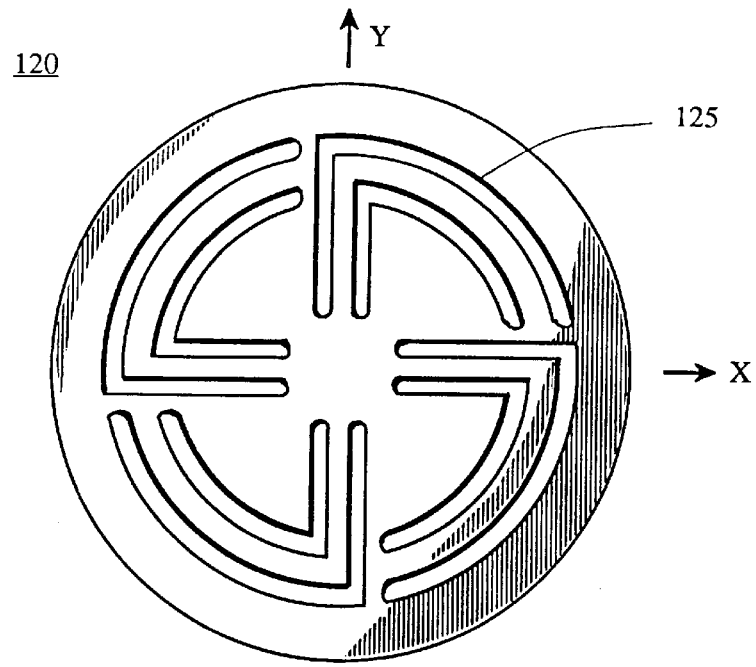
FIG. 20 is a plan view showing the diaphragm 120 used for an acceleration sensor according to the embodiment suitable for mass-production of this invention.

Initially, a diaphragm 120 of which plane view is shown in FIG. 20 is prepared. This diaphragm 120 is of a structure in which a large number of slits 125 are formed on a disk-shaped flexible substrate (thin metallic plate in this embodiment). When a large number of slits 125 having such a pattern are formed on the diaphragm 120, there results a structure such that respective portions of the diaphragm 120 are physically connected by gaps between the respective slits. Namely, a closed region such that all of the periphery portions are surrounded by slits does not exist by any means, and respective portions are necessarily physically connected to the other portions by gap portions between the respective slits. As a whole, the form of a single physical diaphragm is maintained. When the peripheral portion of the diaphragm 120 is fixed to the sensor casing and a force is applied to the central point thereof, a displacement takes place at the central portion on the basis of elastic deformation of the gap portions between the respective slits. Such a diaphragm 120 functions as both the displacement substrate 20 and the supporting means 30. In addition, since the diaphragm 120 is comprised of conductive material (metallic plate), a portion of the diaphragm 120 further functions as displacement electrode E11.

Figure 21:
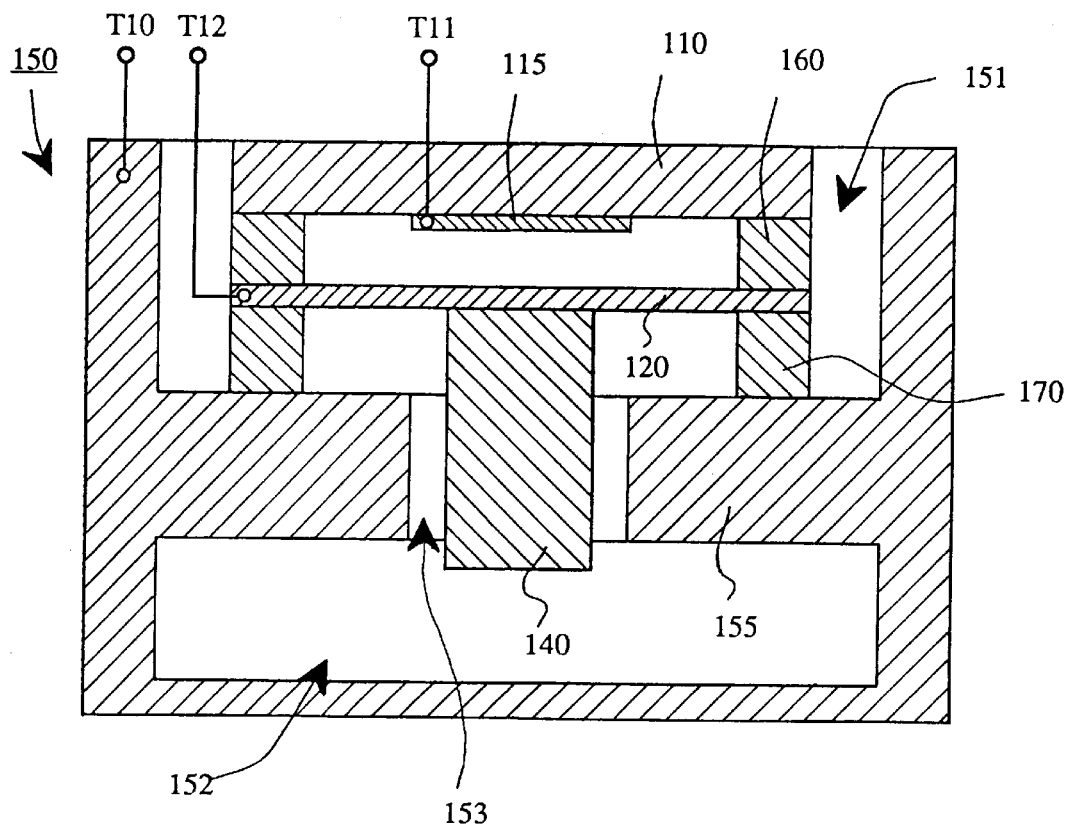
FIG. 21 is a side cross sectional view showing the structure of the acceleration sensor using the diaphragm 120 shown in FIG. 20.

An embodiment of an acceleration sensor constituted with such a dishearten 120 is shown in the side cross sectional view of FIG. 21. In this embodiment, a fixed substrate 110 is a disk-shaped substrate comprised of insulating rigid body. On the lower surface thereof, a disk-shaped fixed electrode 115 is formed. In more practical sense, the fixed substrate 110 is a disc consisting of ceramic or glass epoxy, and the fixed electrode 115 is a metallic layer consisting of silver or aluminum, etc. formed by printing or vacuum deposition technique on the lower surface of the disk. Between the fixed substrate 110 and the diaphragm 120, a spacer 160 in a washer form is inserted. The diaphragm 120 is fixed to the sensor casing 150 by a pedestal 170 in a washer form similar to the spacer 160. The sensor casing 150 consists of metallic material such as aluminum, etc., and constitutes a cylindrical vessel as a whole. Within the sensor casing 150, a partitioning portion 155 in a plate form is formed. By this partitioning portion 155, the inside of the sensor casing 150 is partitioned into an upper space 151 and a lower space 152. In this case, a columnar cavity portion 153 is provided at the central portion of the partitioning portion 155, and the upper space 151 and the lower space 152 are connected through the cavity portion 153. On the lower surface of the diaphragm 120, a weight body 140 comprised of metallic column is secured. The weight body 140 is accommodated within the cavity portion 153.

Eventually, the diaphragm 120, the weight body 140 and the sensor casing 150 of the respective components of this acceleration sensor all consist of conductive material. The pedestal 170 is constituted with insulating material so that the diaphragm 120 and the sensor casing 150 do not (electrically) conduct. In more practical sense, it is sufficient that the pedestal 170 consists of plastic or ceramic. In this embodiment, since the fixed substrate 110 consists of insulating material, even if the spacer 160 is constituted with conductive material such as metal, etc., there is no possibility that the diaphragm 120 and the fixed electrode 115 may conduct. Accordingly, there is no obstacle. It should be noted that the pedestal 170 merely functions to support the diaphragm 120, whereas the spacer 160 not only functions to merely support the fixed substrate 110, but also functions to determine a distance (spacing) between the fixed electrode 115 and the diaphragm 120 (i.e., the electrode spacing of the first capacitance element C1). For this reason, it is preferable to use, as the spacer 160, ceramic whose coefficient of thermal expansion is as small as possible, or the like.

In this acceleration sensor, three output terminals T10, T11, T12 are provided. The output terminal T10 is connected to the metallic sensor casing 150, the output terminal T11 is connected to the fixed electrode 115, and the output terminal T12 is connected to the diaphragm 120.

The acceleration sensor shown in FIG. 21 has a simple structure suitable for mass production as stated above, but performs in principle the function similar to the acceleration sensor shown in FIG. 2. Namely, the central portion of the diaphragm 120 having conductive property serves as the displacement electrode E11 in FIG. 2, and the fixed electrode 115 serves as the fixed electrode E12 in FIG. 2. Accordingly, the electrostatic capacitance between the output terminal T11 and the output terminal T12 corresponds to the electrostatic capacitance of the first capacitance element C1. Moreover, the weight body 140 having conductive property functions as the weight body 40 in FIG. 2, and a portion of the surface thereof functions as the inside electrode E21 in FIG. 2. Further, the end surface close to the cavity portion 153 of the partitioning portion 155 having conductive property functions as the outside electrode E22 in FIG. 2. Accordingly, the electrostatic capacitance between the output terminal T10 and the output terminal T12 corresponds to the electrostatic capacitance of the second capacitance element C2.

As described above, in accordance with the acceleration sensor according to this invention, since an applied acceleration is detected on the basis of change of the electrostatic capacitance value of the capacitance element constituted by the inside electrode and the outside electrode, magnitude of acceleration along the direction included within a predetermined plane can be efficiently detected as an electric signal.

What is claimed is:

1. An acceleration sensor comprising:

a sensor casing;

a displacement substrate accommodated within the sensor casing;

supporting means for elastically supporting a periphery of the displacement substrate with respect to the sensor casing;

a weight body secured to a lower surface of the displacement substrate, having a mass sufficient to allow the supporting means to induce elastic deformation by action of an acceleration to be detected;

an inside electrode formed on a peripheral side surface of the weight body in such a manner to surround a center axis passing through a center of gravity of the weight body and perpendicular to a reference principal surface of the displacement substrate;

an outside electrode having a cylindrical shape which permits the inside electrode to be accommodated therewithin, the outside electrode being fixed to the sensor casing positioned in a manner to surround the inside electrode while maintaining a predetermined spacing between the outside electrode and the inside electrode; and a detection circuit for outputting an electric signal indicating a magnitude of an acceleration applied in a direction in parallel to the reference principal surface on the basis of a change of an electrostatic capacitance of a capacitance element constituted by the inside electrode and the out side electrode;

wherein with respect to a width in the center axis direction of the inside electrode and a width in the center axis direction of the outside electrode, the width of one of said electrodes is greater than the width of the other electrode by an amount at least equal to a range of maximum displacement along the center axis of the weight body, and wherein said inside and outside electrodes are positioned so that effective facing areas of the inside electrode and the outside electrode are constant even if the weight body is caused to undergo displacement along the center axis.

2. An acceleration sensor as set forth in claim 1 which further comprises:

a displacement electrode formed on an upper surface of the displacement substrate; and a fixed electrode fixed to the sensor casing in such a manner to oppose the displacement electrode above the displacement substrate;

wherein the detection circuit further outputs an electric signal indicating a magnitude of an acceleration applied in a direction perpendicular to the reference principal surface on the basis of a change of an electrostatic capacitance of a capacitance element constituted by the displacement electrode and the fixed electrode.

3. An acceleration sensor as set forth in claim 2:

wherein the displacement substrate is constituted by conductive material, and a portion of the displacement substrate is used as the displacement electrode.

4. An acceleration sensor as set forth in claim 1:

wherein a columnar weight body is used to constitute the inside electrode by a first cylindrical electrode formed on a side surface of the columnar weight body, and the outside electrode is constituted by a second cylindrical electrode whose diameter is larger than that of the first cylindrical electrode.

5. An acceleration sensor as set forth in claim 1, wherein a first spacing between the inside electrode and the outside electrode in a first direction perpendicular to the center axis is less than a second spacing between the inside electrode and the outside electrode in a second direction perpendicular to both the center axis and said first direction so that a first detection sensitivity in the first direction becomes greater than a second detection sensitivity in the second direction.

6. An acceleration sensor as set forth in claim 5:

wherein one of the inside electrode and the outside electrode is constituted by a cylindrical electrode which is circular in cross section, and the other is constituted by an elliptic cylindrical electrode which is elliptic in cross section.

7. An acceleration sensor as set forth in claim 1:

wherein the weight body is constituted by conductive material, and a portion of the weight body is used as the inside electrode.

8. An acceleration sensor as set forth in claim 1:

wherein the sensor casing is constituted by conductive material, and a portion of the sensor casing is used as the outside eltectrode.

9. An acceleration sensor as set forth in claim 1:

wherein plural slits are formed on a flexible substrate to thereby constitute a diaphragm serving as both the displacement substrate and the supporting means.

* * * * *